United States Patent [19]

Siwiak et al.

[11] Patent Number: 4,891,637

[45] Date of Patent: Jan. 2, 1990

[54] ACKNOWLEDGE BACK PAGER WITH APPARATUS FOR CONTROLLING TRANSMIT FREQUENCY

[75] Inventors: Kazimierz Siwiak, Coral Springs; James M. Keba, Sunrise; Francis R. Steel, Parkland, all of Fla.

[73] Assignee: Motorola, Inc., Schaumburg, Ill.

[21] Appl. No.: 141,655

[22] Filed: Jan. 7, 1988

[51] Int. Cl.⁴ .............................................. H04Q 7/00
[52] U.S. Cl. ........................... 340/825.44; 340/825.47; 370/93
[58] Field of Search ...................... 340/825.44, 825.47, 340/825.48, 311.1; 370/92, 93, 94, 50, 69.1, 73, 76; 379/56, 57; 455/31, 89, 92

[56] References Cited

U.S. PATENT DOCUMENTS

| | | | |
|---|---|---|---|
| 3,973,200 | 8/1976 | Akerburg | 340/825.44 |
| 4,194,153 | 3/1980 | Masaki et al. | 455/31 |
| 4,208,630 | 6/1980 | Martinez | 455/31 |
| 4,352,955 | 10/1982 | Kai et al. | 379/57 |
| 4,392,242 | 7/1983 | Kai | 455/33 |
| 4,466,001 | 8/1984 | Moore et al. | 340/825.47 |
| 4,590,473 | 5/1986 | Burke et al. | 340/825.44 |
| 4,604,583 | 8/1986 | Aoyagi et al. | 329/122 |
| 4,636,741 | 1/1987 | Mitzlaff | 455/89 |
| 4,646,082 | 2/1987 | Engel et al. | 340/825.44 |
| 4,654,882 | 3/1987 | Ikeda | 455/88 |
| 4,713,808 | 12/1987 | Gaskill et al. | 370/93 |

*Primary Examiner*—Gerald Brigance
*Attorney, Agent, or Firm*—William E. Zitelli; Vincent B. Ingrassia

[57] ABSTRACT

An acknowledge back (ack-back) pager is provided for use in a paging system including a central station which transmits a group of message signals to a group of ack-back pagers which are addressed as a group. The users of the group of addressed ack-back pagers indicate a response to their respective pagers thus providing ack-back data. The pagers in the group of addressed ack-back pagers then simultaneously transmit back to the central station their ack-back data on different frequency sub-bands, a different frequency sub-band being allocated to each of the pagers in the group. To accurately control the ack-back transmit frequency, the pager receives and down-converts the $F_{RX}$ signal thus producing a down-converted $F_C$ signal, the frequency of which is measured and stored. The pager selects which sub-band of a plurality of frequency sub-bands within a predetermined range of frequencies is to be used for transmission of the ack-back signal. The pager determines a frequency offset $F_D$ corresponding to the selected sub-band, such offset being with respect to a predetermined frequency within such range of frequencies. The pager generates an acknowledge back signal at a frequency $(F_C+F_D)$-$F_{CTX}$ and up-converts such signal to a transmit frequency $F_{TX}$ corresponding to said selected sub-band, $F_{CTX}$ being the frequency of a down-converted sample of the $F_{TX}$ signal.

7 Claims, 10 Drawing Sheets

10

100

110

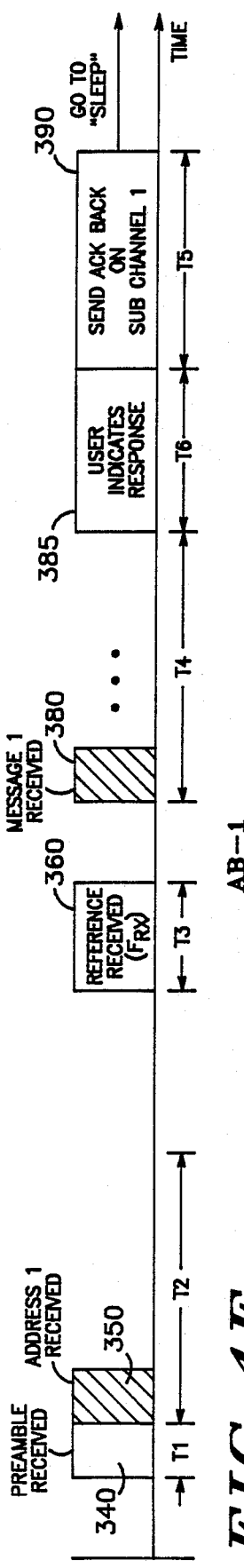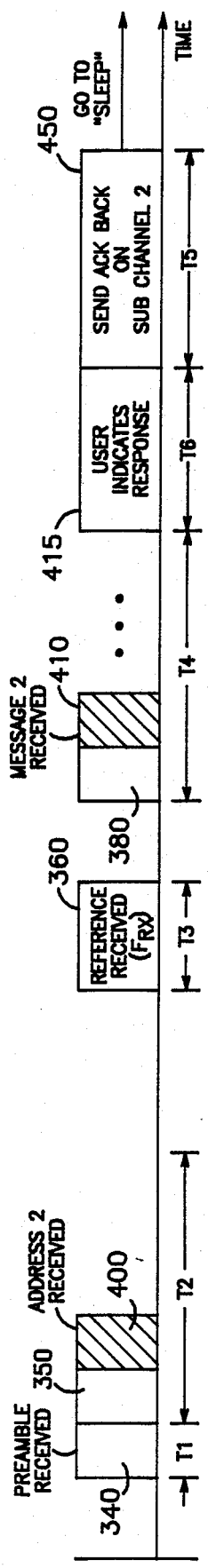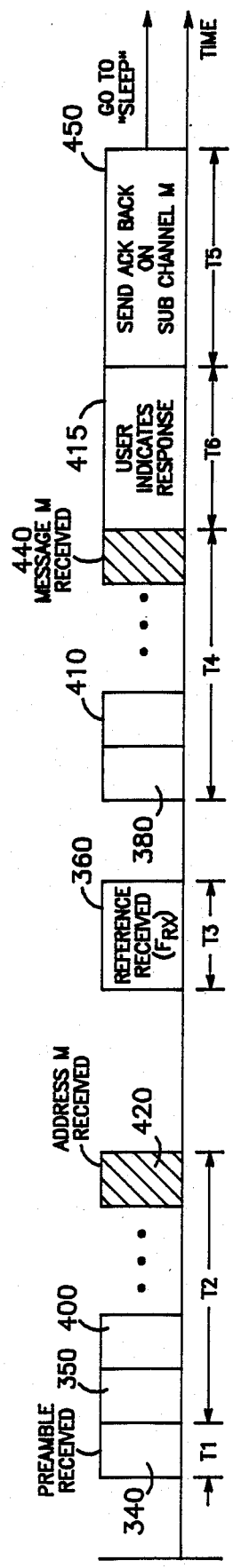

| AB PAGER | SUB-BAND # | FREQUENCY (MHz) | OFFSET ($F_D$) (MHz) |
|---|---|---|---|
| AB-1 | 1 | 149.9905 | -.0095 |
| AB-2 | 2 | 149.9915 | -.0085 |
| AB-3 | 3 | 149.9925 | -.0075 |
| AB-4 | 4 | 149.9935 | -.0065 |
| AB-5 | 5 | 149.9945 | -.0055 |
| AB-6 | 6 | 149.9955 | -.0045 |
| AB-7 | 7 | 149.9965 | -.0035 |
| AB-8 | 8 | 149.9975 | -.0025 |
| AB-9 | 9 | 149.9985 | -.0015 |
| AB-10 | 10 | 149.9995 | -.0005 |
| AB-11 | 11 | 150.0005 | .0005 |
| AB-12 | 12 | 150.0015 | .0015 |
| AB-13 | 13 | 150.0025 | .0025 |
| AB-14 | 14 | 150.0035 | .0035 |
| AB-15 | 15 | 150.0045 | .0045 |
| AB-16 | 16 | 150.0055 | .0055 |
| AB-17 | 17 | 150.0065 | .0065 |
| AB-18 | 18 | 150.0075 | .0075 |
| AB-19 | 19 | 150.0085 | .0085 |
| AB-20 | 20 | 150.0095 | .0095 |

*FIG. 7*

ACKNOWLEDGE BACK PAGER WITH APPARATUS FOR CONTROLLING TRANSMIT FREQUENCY

BACKGROUND OF THE INVENTION

This invention relates in general to radio communications systems. More particularly, the invention relates to radio paging systems.

In the past several years, radio paging technology has advanced from the rather simple tone-only pager (tone alert only, no voice), to the tone and voice pager (tone alert with a voice message) and more recently to the alphanumeric display pager. In a typical conventional alphanumeric display paging system such as that shown as system 10 in FIG. 1, a central transmitter or paging terminal 20 is used to generate the radio pages which are transmitted via a radio link to a fleet of paging receivers 1, 2, 3 . . . N, wherein N is the total number of pagers in system 10. A unique digital address is associated with each of paging receivers 1, 2, 3 . . . N. A page which is transmitted by paging terminal 20 consists of the unique digitally encoded address of the particular pager to which the page is targeted, immediately followed by a corresponding digitally encoded numeric or alphanumeric page message which is intended for display on the target pager.

Typically, the numeric or alphanumeric page message is stored in a memory within the paging receiver for later recall and display by the pager user. Paging receivers are available with a wide range of message storage capabilities which range from the ability to store just a few rather short numeric page messages to the ability to store a relatively large number of longer alphanumeric page messages.

However, conventional display paging systems are generally one way systems. That is, the user receives a paging message from the central terminal but has no way of responding to that message with his or her pager. Instead, the pager user must seek out a telephone or other means of responding to the originator of the paging message.

BRIEF SUMMARY OF THE INVENTION

Accordingly, it is one object of the present invention is to provide an acknowledge back (ack-back) pager which is capable of responding back to the paging terminal and the caller.

Another object of the present invention is to provide an ack-back pager whereby a group of addressed ack-back pagers are capable of simultaneously transmitting acknowledge back signals on a plurality of respective predetermined sub-band frequencies.

Another object of the invention is to provide an acknowledge back pager which can selectably transmit acknowledge back signals on any one of the aforementioned sub-band frequencies with high accuracy.

In one embodiment, the acknowledge back pager of the invention is employed in a radio paging system including a central paging station for transmitting paging signals on a paging channel frequency $F_{RX}$ to a plurality of remotely located acknowledge back radio pagers. The central station transmits a reference carrier signal, that is an $F_{RX}$ reference signal, at frequency FRX at selected times. The acknowledge back pager is capable of controlling the frequency $F_{TX}$ at which the acknowledge back pager transmits acknowledge back signals. The pager includes a receiver for receiving the $F_{RX}$ reference signal. The pager further includes a measuring or counting circuit, coupled to the receiving means, for measuring the frequency of the $F_{RX}$ signal. The pager also includes a selecting circuit for selecting a sub-band from a plurality of frequency sub-bands within a predetermined range of frequencies thus determining a selected sub-band for transmission of an ack-back signal. The pager includes a determining circuit for determining a frequency offset $F_D$ corresponding to the selected sub-band, the offset $F_D$ being with respect to a predetermined frequency within the range of frequencies. A transmitter is coupled to the determining circuit for generating an acknowledge back radio frequency signal at a frequency $F_{RX}+F_D$.

The features of the invention believed to be novel are specifically set forth in the appended claims. However, the invention itself, both as to its structure and method of operation, may best be understood by referring to the following description and the accompanying drawings.

BRIEF DESCRIPTION OF THE DRAWINGS

FIG. 4E is a time vs. event representation of the activity of ack-back pager AB-1.

FIG. 4F is a time vs. event representation of the activity of ack-back pager AB-2.

FIG. 4G is a time vs. event representation of the activity of ack-back pager AB-M.

FIG. 7 is subchannel frequency look-up table employed by the ack-back pagers in the system of the invention.

DETAILED DESCRIPTION OF THE INVENTION

Figure 1:
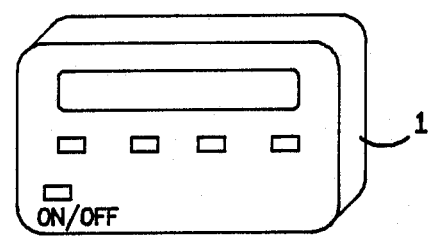
FIG. 1 is a block diagram of a conventional display type radio paging system.
Figure 1:
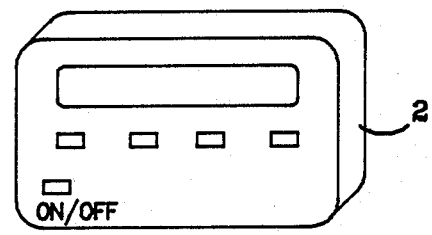
Figure 1:
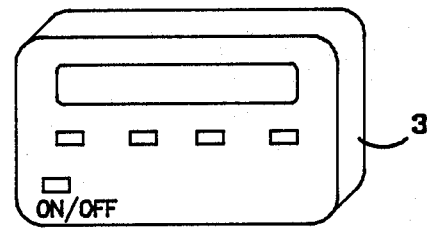
Figure 1:
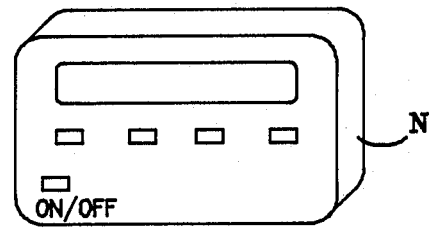
Figure 1:
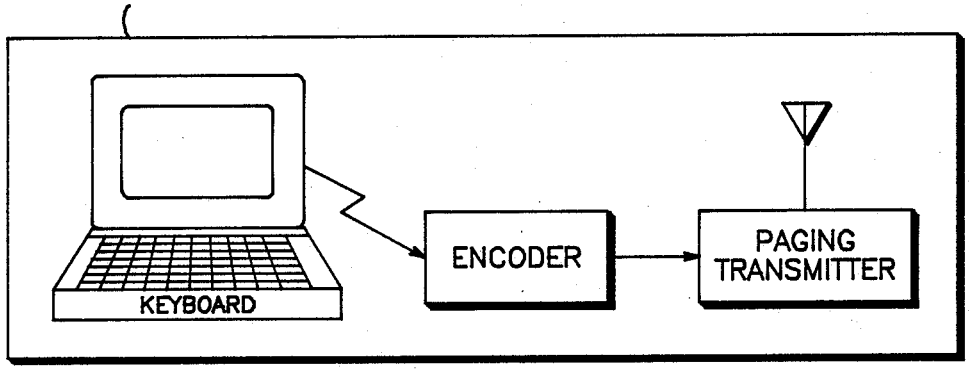
Figure 2:
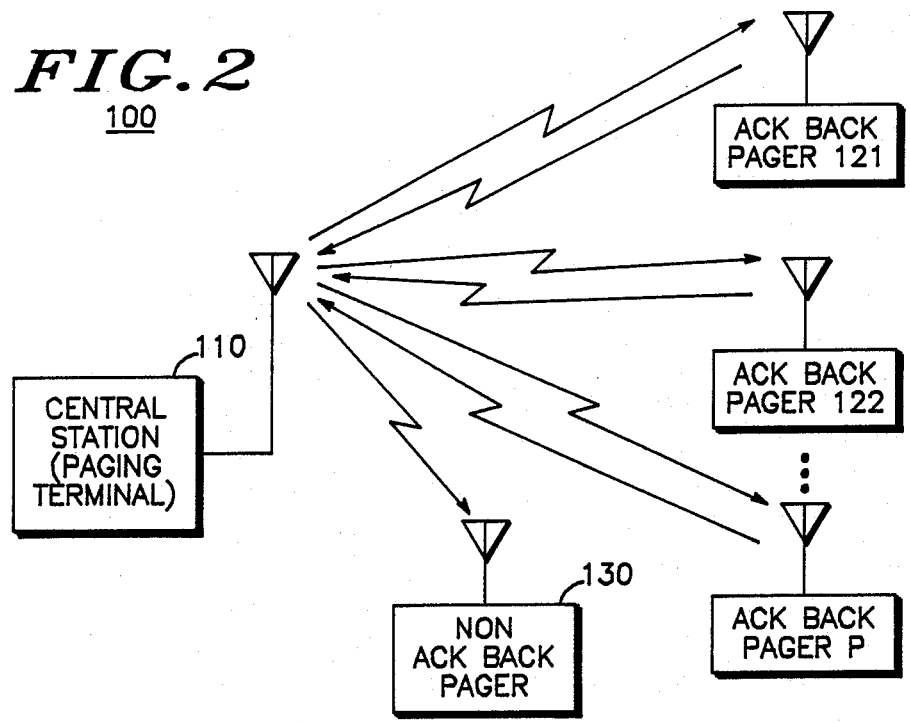
FIG. 2 is a block diagram of the ack-back paging system of the present invention.

FIG. 2 is a simplified block diagram of the acknowledge back paging system 100 of the present invention. Paging system 100 includes a central station or paging terminal 110 which is capable of both transmitting outgoing paging signals and of receiving acknowledge back (ack-back) paging signals. Paging system 100 includes a plurality of ack-back pagers 121, 122 . . . P, wherein P is the total number of ack-back pagers in the pager population of system 100. Each of ack-back pagers 121, 122 . . . P has the capability of receiving paging signals from central station 110 and of permitting the pager user, and/or pager, to respond to such paging signals. That is, pagers 121, 122 . . . P permit the user to reply or acknowledge back to a page from central station 110. It is noted that conventional non ack-back pagers such as pager 130 are also includable in system 100. In FIG. 2, double arrows between central station 110 and each of ack-back pagers 121, 122 . . . P are used to denote that two way communication exists between central station 110 and such ack-back pagers. A single arrow denotes that only one way communication exists between station 110 and pager 130.

It is noted that in one embodiment of the invention, in an acknowledge back paging system, acknowledge back pagers reply back with acknowledge back signals at an approximately 2 watt power level. Since, in this example, the power level of the ack-back signal is approximately 20 dB smaller than the power radiated by the paging transmitter, the bandwidth of the ack-back signal is kept small (approximately 100 bits/sec in this embodiment) in order to keep the range of the central station and the acknowledge back pager approximately equal. The relatively narrow bandwidth of the ack-back signal imposed a stringent frequency tolerance (approximately 30 Hz in this embodiment) on the transmitter portion of the ack-back pager.

Figure 3:
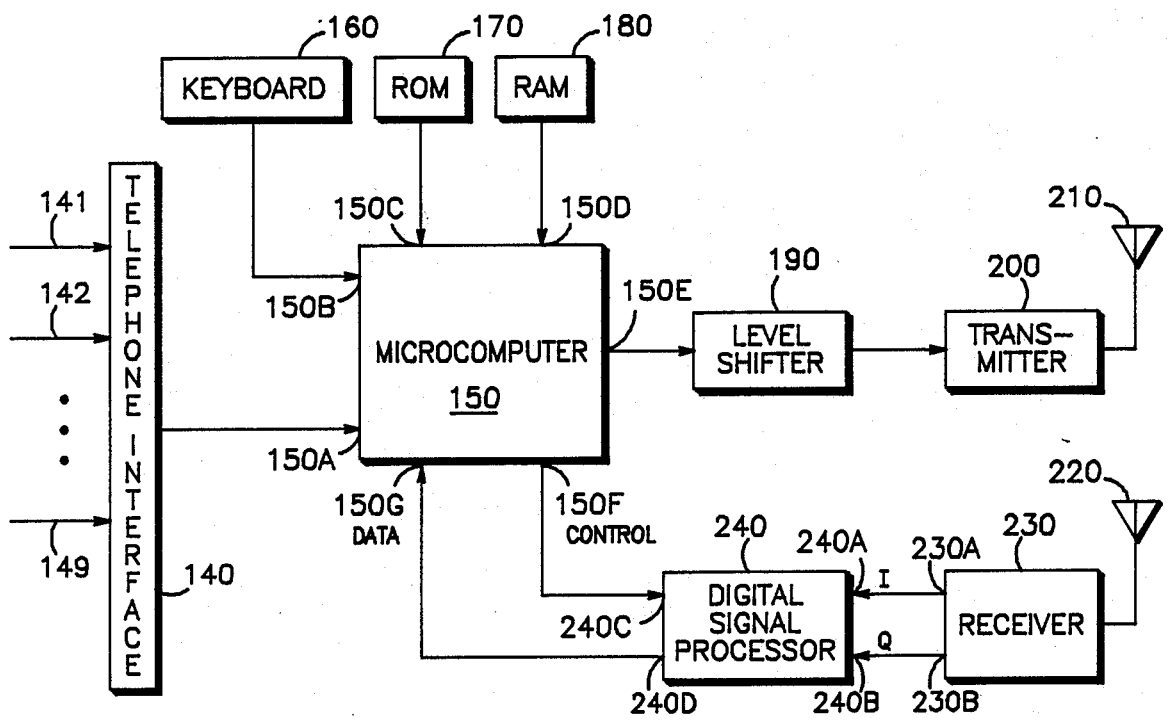
FIG. 3 is a block diagram of the central station employed in the paging system of FIG. 2.

FIG. 3 is a more detailed block diagram of central station or paging terminal 110. Central station 110 includes a conventional telephone interface 140 of the type generally used for central paging terminals. Telephone interface 140 couples outside telephone lines 141, 142, etc. to an input 150A of a microcomputer 150. Telephone interface 140 converts message signals from lines 141, 142, etc. to digital signals which microcomputer 150 can process. For example, a caller wishing to send an alphanumeric page to an ack-back pager user uses dual tone multi frequency (DTMF) to key in a desired message. Telephone interface 140 then converts such analog DTMF alphanumeric message to its digital equivalent which microcomputer 150 processes as discussed later in more detail. Central station 110 further includes a keyboard 160 coupled to a data input 150B of microcomputer 150. Keyboard 160 permits an operator to directly input messages into microcomputer 150 for transmission to pagers within the pager population.

A read only memory (ROM) 170 is coupled to a memory port 150C of microcomputer 150. ROM 170 includes a control program which controls the operation of microcomputer 150 and the circuits coupled thereto. A random access memory (RAM) 180 is coupled to a memory port 150D microcomputer 150. RAM 180 provides temporary storage space for microcomputer 150 as it carries out the instructions of the control program within ROM 170.

When a paging message and the identity of the particular pager to be addressed are provided to microcomputer 150, the control program causes microcomputer 150 to generate digital paging signals at its output 150E according to the protocol later described. Microcomputer output 150E is coupled via a level shifter 190 to the input of a transmitter 200. The output of transmitter 200 is coupled to an antenna 210 having dimensions and characteristics appropriate to the particular paging frequency channel selected for the operation of central station 110. Level shifter 190 serves to adjust the signal level of the paging signals generated at microcomputer output 150E to a level appropriate for the input of transmitter 200.

For purposes of this example, it will be assumed that ack-back pagers 121, 122-P are acknowledging back via phase shift keyed (PSK) digital modulation. Those skilled in the art will appreciate that other forms of modulation as well may be employed by acknowledge back pagers 121, 122-P to respond to the paging signals transmitted by central station 110. In such a PSK embodiment, central station 110 includes a receive antenna 220 for receiving the ack-back signals transmitted by ack-back pagers 121, 122-P. In actual practice, antenna 210 may also be employed as antenna 220. Receive antenna 220 is coupled to the input of a PSK receiver 230 which includes an in-phase (I) output 230A and a quadrature (Q) output 230B. Receiver outputs 230A and 230B are respectively connected to inputs 240A and 240B of digital signal processor 240. One digital signal processor which may be employed as processor 240 is the model DSP56000 manufactured by Motorola, Inc. Digital signal processor 240 includes a control input 240C which is coupled to a control output 150F of microcomputer 150 to permit microcomputer 150 to control processor 240. Digital signal processor 240 further includes a data output 240D which is coupled to the data input 150G of microcomputer 150. Thus, it is seen that digital signal processor 240 decodes the digital data received at the I and Q inputs 240A and 240B thereof and transforms such information into digital data which is provided to microcomputer data input 150G.

Figure 4A:
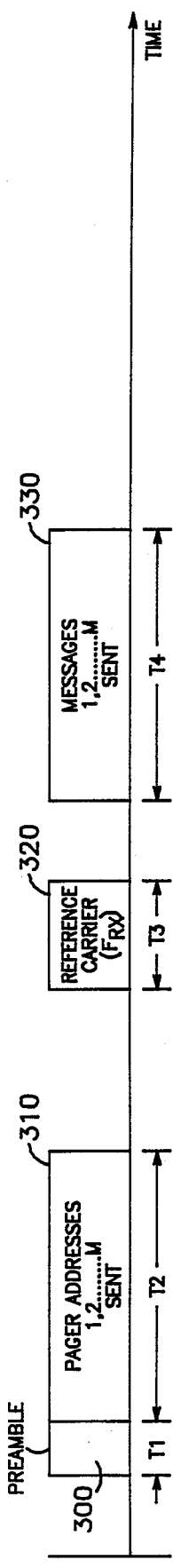
FIG. 4A is a time vs. event representation of the transmissions from the central station of the system of the invention.

FIG.'s 4A–4I are timing diagrams which show the signaling protocol employed by central station 110 and ack-back pagers 121, 122-P. More specifically, FIG. 4A is a simplified timing diagram of the paging protocol transmitted by central station 110. In FIG. 4A, time is represented on the horizontal axis and respective events are denoted as they occur at designated points in time along such time axis. Central station 110 first transmits a preamble signal 300 during a time interval T1. In one embodiment, preamble symbol 300 consists of a plurality of alternating 0's and 1's transmitted for a duration of time T1. For example, preamble symbol is a 010101 . . . signal.

In accordance with the present invention, central station 110 groups paging addresses into groups of M wherein M is the number of paging addresses in a particular group. For purposes of this example, and not by way of limitation, the number of paging addresses and thus the number of messages corresponding to such addresses is selected to be 20 (that is, M=20). That is, as messages are called into central station 110 via telephone interface 140 or keyboard 160, such paging messages and corresponding address information are held or stored in RAM 180 until a group of up to M=20 messages has been provided to station 110. In alternative embodiments of the invention, non ack-back pages may be interspersed with ack-back pages to increase the efficient throughput of the paging system if desired as will be discussed later. The group of M=20 ack-back pagers is a subgroup of the overall population of P pagers. Once station 110 has received 20 or M paging messages, microcomputer 150 sequentially transmits the 20 corresponding addresses as a group 310 during a time interval T2 subsequent to time interval T1 as shown in FIG. 4A.

Figure 4B:
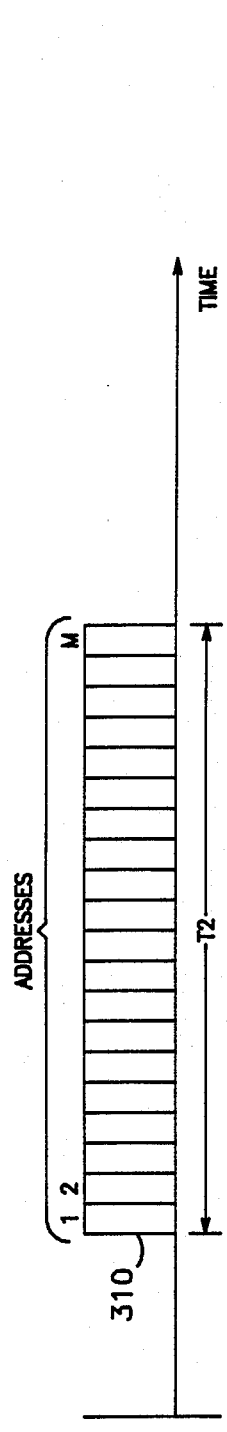
FIG. 4B is a representation of an address block used in the paging protocol of the paging system of the invention.

FIG. 4B shows the sequential relationship of each of the addresses within group 310. The address of the first pager of the group of M pagers to be addressed is designated address 1 and is transmitted first in group 310 as shown. The pager to which address 1 corresponds is designated AB-1 for reference. The address of second pager of the group of M selected ack-back pagers is designated address 2 and is transmitted immediately following address 1. The pager to which address 2 corresponds is designated pager AB-2. This process of address transmission continues sequentially in the same fashion until all of the addresses of the group of M pagers are transmitted ending with address M, the address of the last or M'th pager in group 310. The pager to which address M corresponds is designated pager AB-M. A non-ack back pager AB-3 is shown addressed in the block of M pages as will be described later in the discussion of FIG. 4H.

In one embodiment of the invention, the duration of time during which preamble signal 300 is transmitted, namely T1, is approximately equal to 10 msec. Those skilled in the art will appreciate that T1 may have values greater than or less than 10 msec providing T1 is sufficiently long to permit the ack-back receivers 121, 122 ... P to synchronize to the paging signals transmitted by central station 110. Apparatus for synchronizing paging receivers to paging signals is well known to those skilled in the art and is included in ack-back pagers 121, 122 ... P.

For purposes of example, the time duration T2 of the group 310 of addresses is selected to be approximately equal to 1 sec. Those skilled in the art will appreciate that T2 may actually be greater or less than 1 sec depending upon the number of paging addresses M selected to be in the group 310 and the rate of transmission of the digital data comprising such paging addresses. The selection of the time period T2 in this example should not be taken as in any way limiting the invention. To reiterate, the particular pagers of the population P which are addressed in address block 310 are designated as pagers AB-1 (the first pager to be addressed), pager AB-2 (the second pager to be addressed) ... pager AB-M (the last pager addressed of the group of M pagers).

Figure 4C:
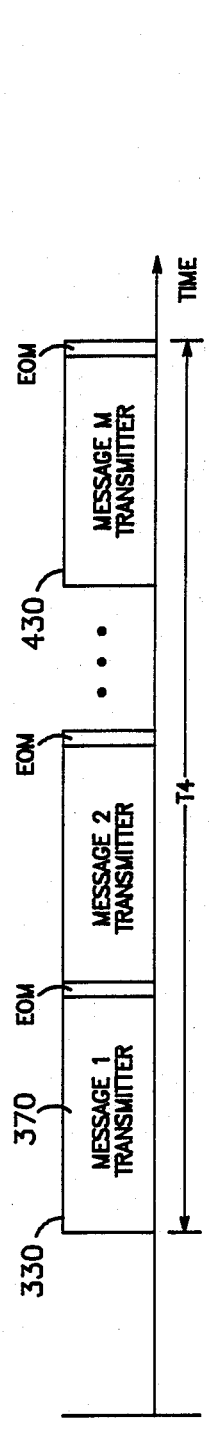
FIG. 4C is a representation of a message block used in the paging protocol of the paging system of the invention.

After transmission of the group of M addresses, central station 110 transmits a reference carrier signal at a frequency $F_{RX}$ at 320 during a time interval T3 following time interval T2. Subsequent to transmission of reference carrier 320, central station 110 sequentially transmits the 20 paging messages corresponding to the 20 paging addresses of address group or block 310. More specifically, these M or 20 data messages are sent as a group or block 330 of messages. Each of the M messages in block 330 bears a predetermined relationship to the order of the pager addresses in block 310. For example, in one embodiment of the invention and as shown more clearly in FIG. 4C, message block 330 includes message 1 data followed in time by an end of message (EOM) field. The EOM field of message 1 is followed sequentially in time by the message 2 data which is in turn followed by another EOM field. The process of sending the respective messages 3, 4, etc. within message block 330 continues until message M is transmitted followed by a respective EOM field as shown in FIG. 4C.

In the embodiment of the invention described above, the predetermined relationship between the sequence of messages transmitted in message block 330 and the sequence of pager addresses transmitted in address block 310, is conveniently selected such that address 1 is first transmitted in block 310 and the message 1 corresponding to such address 1 is transmitted first in the later following message block 330 occurring during time slot T4. To illustrate this predetermined relationship further, address 2 is transmitted second, that is immediately after address 1 in address block 310. Correspondingly, in the later following time slot T4, message 2 is transmitted second, that is, immediately following message 1's EOM field. The same relationship exists between the remaining addresses in block 310 and messages in block 330.

The invention, however, is not limited to the particular predetermined relationship described above between the sequence of pager addresses in address block 310 and corresponding messages in message block 330. For example, in another embodiment of the invention, the sequence of pager addresses would remain as illustrated in FIG. 4B with address 1 being sent first followed by address 2 and so forth until address M is transmitted completing the block. However, the sequential order in which the messages in message block 330 are transmitted in such embodiment may commence with transmission of message M first followed by message M-1 (or message 19) followed by message M-2 (18) and so forth until message 1 is finally transmitted at the end of message block 310. (EOM fields are still situated between messages.) What is important here is that a predetermined relationship exists between the order in which the paging addresses are transmitted in address block 310 to the order in which the paging messages are transmitted in message block 330 so as to permit acknowledge back pagers AB-1, AB-2, . . . AB-M to match a particular message within block 330 to a respective paging address of block 310. This enables a particular pager to determine which of the 20 paging messages in block 330 is intended for it, as will be discussed subsequently in more detail. Although examples have been discussed above wherein the predetermined relationship between the order of the pager addresses of address block 310 and the paging messages of message block 330 are both ascending, and in the other example ascending/descending, those skilled in the art will appreciate that an arbitrary relationship between the paging addresses on block 310 and the paging messages of block 330 may also be selected as long as this predetermined known relationship is programmed into acknowledge back pagers 121, 122 ... P.

A reference carrier exhibiting a frequency of $F_{RX}$ is generated during a period of time T3 subsequent to the end of transmission of the pager addresses in address block 310. In one embodiment of the invention, T3 is equal to approximately 70 msec. Those skilled in the art will appreciate that T3 may be longer or shorter than 70 msec providing the reference carrier shown at 320 exhibits a time duration sufficiently long to enable frequency determining circuitry, later described, in ack-back pagers 121, 122 ... P to determine the frequency of reference carrier 320.

Figure 4D:
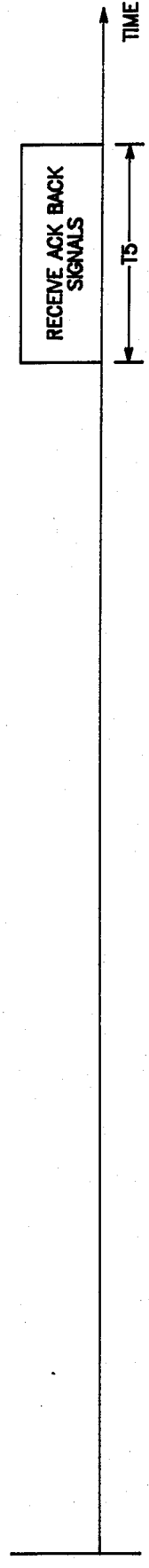
FIG. 4D is a time vs. event representation of the receiver portion of the central station.

FIG. 4D is a time vs. event diagram of the status of receiver 230 in central station 110. Subsequent to time period T4, receiver 230 at central station 110 is turned on to receive ack-back signals from the 20 pagers in the group of M during a time period T5. Each of the group of M ack-back message signals transmitted by the respective ack-back pagers in the group of M are on a different respective frequency sub-band within a common frequency channel as will be discussed in more detail subsequently. Receiver 230 is thus capable of distinguishing and decoding message signals on each of the 20 or M different sub-band frequencies. The configuration and operation of receiver 230 is discussed in more detail later.

FIG. 4E is a time versus event diagram for the status of ack-back pager AB-1, that is, the first addressed pager of the group of M pagers. FIG. 4E is drawn to the same time scale as FIG. 4A. During the T1 time interval, pager AB-1 receives the preamble at 340. During the following time period T2, pager AB-1 receives and decodes address 1, which in this example is the address of pager AB-1. It is noted that prior to reception of the preamble at 340, pager AB-1 is in a "sleep" or "battery saver" state That is, prior to such T1 time period, pager AB-1 and the other pagers of the population of P pagers, have several of their power consuming circuits turned off or placed in low power consumption states. Those skilled in the art are already familiar with the powering down of radio pager circuits in order to achieve battery saving and thus exactly which circuits in the pager are powered down, and the degree to which they are powered down, are not discussed here in detail. What is important, however, is that the ack-back pagers of the population of P pagers are placed in a "battery saving" state or "sleep state" during prescribed periods of time such as that mentioned above and which will be later specified.

When pager AB-1 receives the preamble 340 during time period T1, pager AB-1 is switched from a battery saving state to a fully operational state such that pager AB-1 is capable of receiving information transmitted thereto. That is, subsequent to reception of the preamble at 340, pager AB-1 is fully turned on such that pager AB-1 receives and decodes its address at 350 at the beginning of the T2 time period. In one embodiment of the invention, pager AB-1 conveniently returns to the "sleep state" for the remainder of the T2 time period during which pager addresses are transmitted. Prior to receiving the reference carrier $F_{RX}$ at time period T3, pager AB-1 is returned from the "sleep state" to the fully operational state. Upon reception of the reference carrier, $F_{RX}$ at 360, pager AB-1 determines the frequency of such carrier in a manner described in more detail subsequently.

Referring to FIG. 4E, in conjunction with 4C, it is seen that the message 1 transmitted during time period T4 at 370 is received by pager AB-1 at 380 as shown in FI.. 4E. Pager AB-1 receives message 1 at 380 and matches message 1 to address 1. That is, by means later described in more detail, pager AB-1 is programmed to determine that message 1 is the particular message of the group of M messages which is intended for pager AB-1. Subsequent to reception and display of message 1 at 380 as shown in FIG. 4E, the user of pager AB-1 indicates his or her response to message 1 during a time period T6 at 385. Time period T6 is not drawn to scale with respect to the other time periods discussed. Time period T6 is sufficiently long to permit indication of a response by the pager user. Subsequent to time period T6, pagers AB-1, AB-2 ... AB-M simultaneously transmit acknowledge back signals on respective frequency sub-bands (subchannels) back to central station 110 as at 390 during a time period T5. Subsequent to the ack-back transmission at 390, pagers AB-1, AB-2 ... AB-M are placed in the "sleep state" until awakened again by a preamble as at 340. In an alternative embodiment of the invention, ack-back pagers AB-1 ... AB-20 reply back automatically without action by the pager user. In such an embodiment, prior to being paged, the user preselects a reply already stored in the pager or keys into the pager a predetermined message which the pager uses as the ack back reply when it is later addressed by central station 110. For example, the ack-back pager user selects a "not available" response or otherwise keys into the pager a "not available" response when the pager user wishes to inform callers into central station 110 that the pager user is not taking any calls currently. Clearly, the reply data may be provided to the ack-back pagers in many different ways. In the case of a user selectable response already programmed into the pager, time period T6 can be arbitrarily short, that is just sufficiently long enough to permit transmission of such a selectable response whose length is predetermined and known to the microcomputer 150 in central station 110.

FIG. 4F is a time versus event diagram of the status of ack-back pager AB-2, that is, the second pager addressed of the group of M ack-back pagers. Pager AB-2 receives the preamble at 340 and then switches from a "sleep state" to a fully turned on state. Pager AB-2 receives address 1 (the address of pager AB-1) at 350. Pager AB-2 decodes such address 1 at 350 and determines that the decoded address is not its own address. At 400, pager AB-2 receives its own address, namely address 2. Pager AB-2 decodes and determines that address 2 is its own address. As with pager AB-1 of FIG. 4E, pager AB-2 of FIG. 4F goes to the "sleep state" for the remainder of the T2 time period. Pager AB-2 "wakes up" in time for reception of the reference carrier $F_{RX}$ at 360 during time period T3. As seen by examining FIG. 4F in conjunction with FIG. 4C, pager AB-2 receives the AB-1 page data transmitted at 370 within time period T4. As explained in more detail subsequently, pager AB-2 determines that the AB-1 message data is not a match. That is, pager AB-2 determines that the pager AB-1 message data (message 1) is not intended for pager AB-2. After the end of message (EOM) marker following message 1, pager AB-2 receives the AB-2 message data (message 2) at 410 within time period T4. Pager AB-2 determines that the message 2 data at 410 is a match and that such message 2 data is intended for AB-2. The message 2 data is then displayed to the user of pager AB-2 who indicates an acknowledge back response to pager AB-2 during time period T6 at 415. During the subsequent time period T5, the acknowledge back message is sent to central station 110 on a second frequency sub-band different from the first frequency sub-band on which pager AB-1 transmits. Subsequent to transmission of the acknowledge back response at time period T5, pager AB-2 is caused to go to sleep.

FIG. 4G is a time versus event diagram of the status of ack-back pager AB-M, the last of the group of M pagers to be addressed. Pager AB-M receives the preamble at 340 to switch it from a "battery saver state" to a fully operational state. Pager AB-M then receives the 19 addresses of the other pagers in the group of M, such as at 350 and 400 until finally pager AB-M receives and decodes its own address at 420. Pager AB-M is thus signaled that a message for it will be transmitted momentarily. Pager AB-M receives the reference carrier signal $F_{RX}$ at 360. Referring to FIG. 4G in conjunction with FIG. 4C, it is seen that pager AB-M receives message 1, message 2 . . . message M-1 and determines that all of these messages are not matches. That is, such page data messages are not intended for AB-M. Pager AB-M receives the page data message M transmitted at 430 (FIG. 4C) and received at 440 (FIG. 4G) within time period T4. Pager AB-M determines that such message M at 440 is intended for pager AB-M and displays the contents as such message M to the pager user. During time period T6 at 415, the pager user supplies ack-back pager AB-M with an acknowledge back response. During the subsequent time period T5, pager AB-M sends such acknowledge back response back to the central station 110 on a frequency sub-band M at 450 different from the frequency sub-bands on which the remaining ack-back pagers AB-1, AB-2 . . . AB-(M-1) transmit. Subsequent to the transmission of the ack-back response at 450 during time period T5, pager ABM switches to the "sleep state".

Figure 4H:
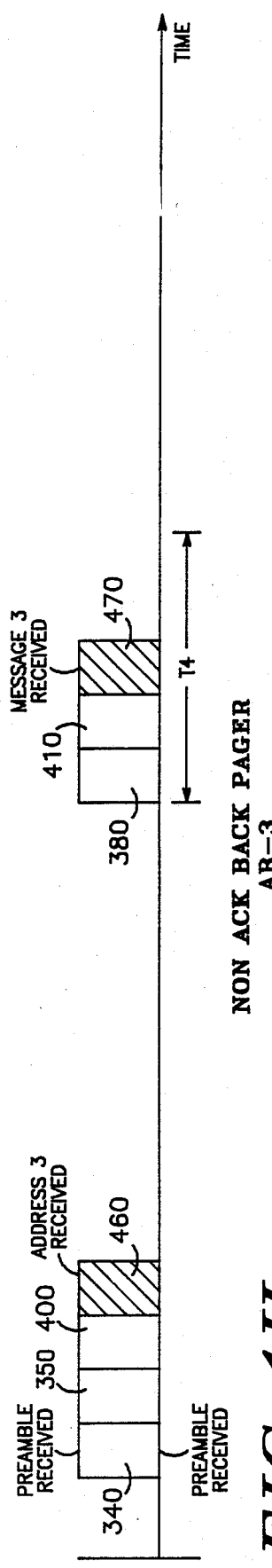
FIG. 4H is a time vs. event representation of the activity of a non ack-back pager in the paging system of the invention.

One embodiment of the invention accommodates the situation where one or more of pagers within the group of M pagers are not ack-back pagers. For example, it will be assumed that pager AB-3 is not a pager with acknowledge back capability, but rather is an alphanumeric display pager which operates as shown in the time versus status diagram of FIG. 4H. Non ack-back pager AB-3 receives a preamble at 340 which causes pager AB-3 to switch from a "sleep state" to a fully operational state. Subsequent to reception of the preamble at 340, non ack-back pager AB-3 receives address 1 at 350 and address 2 at 400 during time interval T2. In this particular example, it is assumed that pager AB-3 is the third pager addressed within time interval T2. That is, address 3 is the address which corresponds to pager AB-3. Pager AB-3 receives address 3 within time interval T2 at 460 as shown in FIG. 4H. Pager AB-3 decodes address 3 and determines that pager AB-3 has been paged and that a page data message will be transmitted to it shortly. Non ack-back pager AB-3 is activated to an "awake state" during time interval T4. Pager AB-3 then locates the particular AB-3 page message which is intended for it within time period T4. That is, since the predetermined relationship between the order of the page messages transmitted within time period T4 is known by pager AB-3 with respect to the order of the addresses transmitted within a time period T2, pager AB-3 locates or matches the AB-3 page data message at 470 in a manner similar to that employed by the remaining pagers within the group of M. For example, in this embodiment of the invention, since pager AB-3 was the third pager to be addressed in the group of M pagers, pager AB-3 will expect its message to likewise be third in the sequence of messages with message block 330 (FIG. 4A) or more specifically at 470 of FIG. 4H. Once message 3 is so selected, pager AB-3 displays message 3 to the pager user. In this particular embodiment, the pager user does not have the option to transmit a response back to the central station 110. Thus, non ack-back pager AB-3 is switched to a "sleep state" after the AB-3 message corresponding thereto has been received.

Figure 4I:
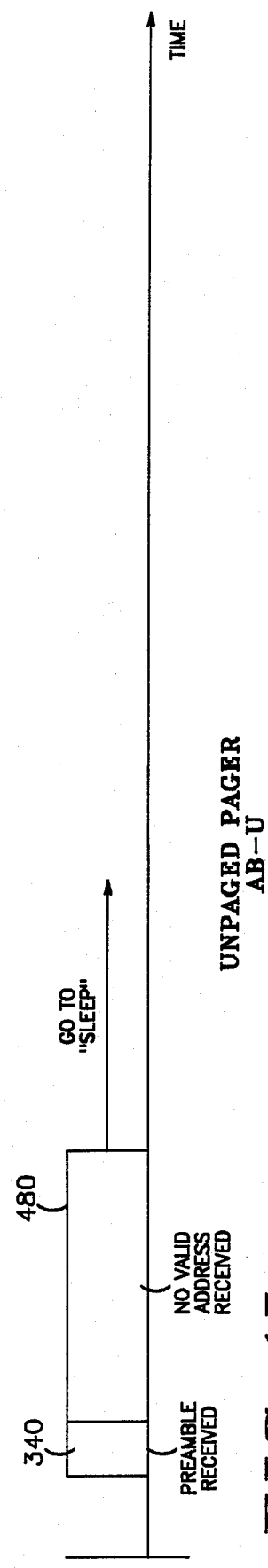
FIG. 4I is a time vs. event representation of the activity of an unpaged ack-back pager in the paging system of the invention.

FIG. 4I is a time versus event diagram of the status of an unpaged ack-back pager of the population of ack-back pagers 121, 122, . . . P. That is, FIG. 4I illustrates what occurs when an ack-back pager receives and decodes addresses which do not correspond to the unique address of such unpaged pager. More specifically, the unpaged pager, which is referred to as pager AB-U, receives the preamble signal at 340 and switches from a "sleep state" to a fully operational state. Pager AB-U then proceeds to receive a group of M or 20 pager addresses at 480 during time interval T2. Pager AB-U fails to find its address within that group of M addresses. Thus, after time period T2, pager AB-U returns to the "sleep state" where it will remain for a predetermined period of time. Alternatively, at the end of address block 480, a "go to sleep" signal can be transmitted to all pagers which did not receive a valid address to cause such pagers to enter the sleep state. FIG. 4I also represents the time versus event status of an unpaged non ack-back pager.

Figure 5:
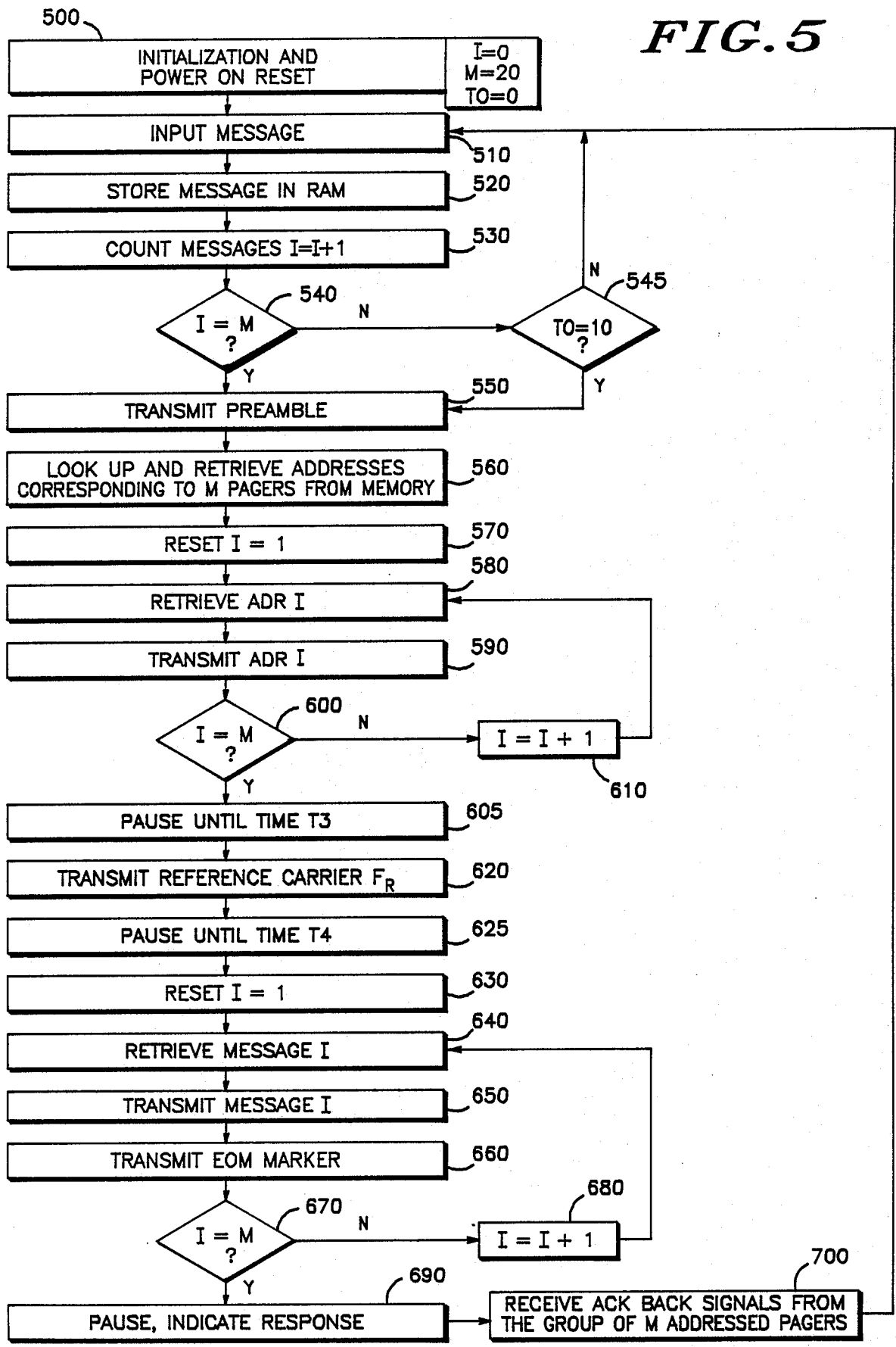
FIG. 5 is a flowchart depicting the operation of the central station in the paging system of the invention.

FIG. 5 is a flow chart of the control program which is resident in ROM 170 of central station 110. This control program controls the operation of microcomputer 150 in the manner which follows. The flow chart of FIG. 5 summarizes the operation of central station 110 which was described above in the discussion of the signaling protocol illustrated in FIG.'s. 4A-4I. In accordance with block 500 of the flow chart of FIG. 5, microcomputer 150 is subjected to a power-on reset when it is turned on. That is, system variables are initialized at that point in time. For example, M, which is the number of ack-back pagers in a particular group is initialized at a predetermined number, for example 20. Additionally, a message counter variable, I, is initialized at a value of 0 in block 500. Once initialized, central station 110 is ready to accept messages from telephone callers into interface 140 or from a system operator at keyboard 160 as per block 510. When a message for a particular pager user is input into central station 110, such message is stored in RAM 180 together with indicia of the particular pager for which such message is intended as per block 520. Such message is counted by incrementing the message counter variable I by the quantity 1 as per block 530. Microcomputer 150 then makes a determination as to whether the number of messages which have been collected and stored in memory is equal to M or 20 in this example. That is, as per decision block 540, microcomputer 150 determines whether message counter I equals M. If the message counter I does not equal M, which signifies that a group of M messages have not yet been fully collected, then flow continues to block 545 where a determination is made whether or not a time out of T0, for example T0=10 sec, has been exceeded. If the time out has not been exceeded, then flow continues back to input block 510 to await input of yet another message. If in block 545 it determined that the time out has been exceeded, then a preamble signal is transmitted at block 550. This time out feature is provided so that the microcomputer 150 will not have to wait for long periods of time for a queue of M messages to be collected prior to transmitting such messages. If prior to expiration of the time out, it is determined that message counter I does equal M at block 540, then transmission of the preamble signal is commenced at block 550.

Microcomputer 150 then looks up and retrieves from memory the addresses which correspond to each of the group of M pagers as seen at block 560. The addresses within such group of M pagers are sequentially transmitted in a predetermined order, for example, "first in last out" or "first in first out", as per subsequent blocks 570 through 610. More specifically, counter I is reset to 1 and now functions as an address counter as per block 570. Address I is retrieved from memory as per block 580. That is, in the first time through the loop starting at 580, since I=1, address 1 is retrieved from memory. That is, microcomputer 150 looks up the particular pager address which corresponds to the pager for which message 1 is intended. Address I is then transmitted as per block 590. At decision block 600, microcomputer 150 makes a determination of whether or not all M addresses of the group of M addresses corresponding to the M messages have been transmitted. This is determined by microcomputer 150 calculating whether or not I is equal to M. If address counter I is not equal to M, then all 20 addresses have not been transmitted and I is then incremented by 1 as per block 610. Flow then continues back to block 580 at which the next address of the group of M=20 addresses is retrieved from memory. This process continues until I=M at block 600 which signifies that all 20 addresses have been retrieved and sequentially transmitted as a group. Program execution is suspended by block 605 until the beginning of time interval T3 at which time flow then continues to block 620 where reference carrier $F_{RX}$ is caused to be transmitted. Then, program execution is again suspended by block 625 until the beginning of time interval T4.

Counter I is then reset to I=1 as per block 630. Counter I is now employed as a message counter again in the subsequent portion of the flow chart of FIG. 5. Message I is retrieved from memory at block 640. The first time through the loop starting at block 640, I is equal to 1 and thus message number 1 is retrieved at block 640 the first time through such loop. Message I, or in this case message 1, is then transmitted by central station 110 as per block 650. An end of message (EOM) marker is transmitted immediately subsequent to message 1 to mark the end of such message as per block 660. A determination is then made at decision block 670 as to whether or not all of the messages in the group of M messages have been retrieved from memory and transmitted. This is accomplished by microcomputer 150 making a determination as to whether I is presently equal to M. If microcomputer 150 finds that I is not yet equal to M, then I is incremented by 1 as per block 680 and flow continues back to retrieve message block 640. The next message, for example message 2, is then retrieved from memory as per block 640. Message 2 is then transmitted as per block 650 and followed by an end of message (EOM) marker as per block 660. This process continues until finally all M messages have been transmitted followed by respective EOM markers. It is thus seen that the M messages are transmitted as a message group.

From the flow chart of FIG. 5, it will be observed that the group of messages transmitted as per block 640 through 680 bears a predetermined order relationship with respect to the order of the transmission of the addresses of the corresponding group of M addresses as per blocks 570 through 610. That is, in this particular example address 1 was first transmitted, followed by address 2 and so forth up to address M. In this example, the transmission of the group of M messages occurs in the same order as the group of addresses. That is, message 1 corresponding to the first address is first transmitted followed by message 2 which corresponds to the second address and so forth up to message M which corresponds to the M'th addressed pager. Other predetermined relationship orders are possible between the order of transmission of the messages of the group of M messages and the order of the group of M addresses as has been discussed earlier. What is important, is that such predetermined relationship between the message order and the address order is known and is programmed into the ack-back pagers as is discussed later in more detail.

After it is determined that the transmission of the group of M messages is complete as per block 670, flow continues to block 690 at which central station 10 pauses to permit the ack-back pager users which have received messages to key an appropriate response into their ack-back pagers for transmission subsequently back to central station 110. For example, such ack-back pagers may include a keyboard or a switch that is toggled by the message recipient to signify a yes or a no. It will be appreciated that it will take significantly less time for a user to toggle one key to indicate a predetermined response, for example a yes or a "canned message" (for example, I will call you back), than it would take for a user to key in a response on a keyboard or keypad situated on the pager. However, such keyboard or keypad embodiments of the ack-back pager herein are considered to be within the scope of the invention in that they provide alternative ways of indicating the user's response to the ack-back pager. After pausing to permit the addressed pager users to key in their responses, central station 110 simultaneously receives M ack-back signals from a group of M addressed pagers as per block 700. These ack-back responses are then provided to the appropriate corresponding callers via telephone interface 140. Flow then continues back to block 510 to permit other paging messages to be input into central station 100.

Figure 6:
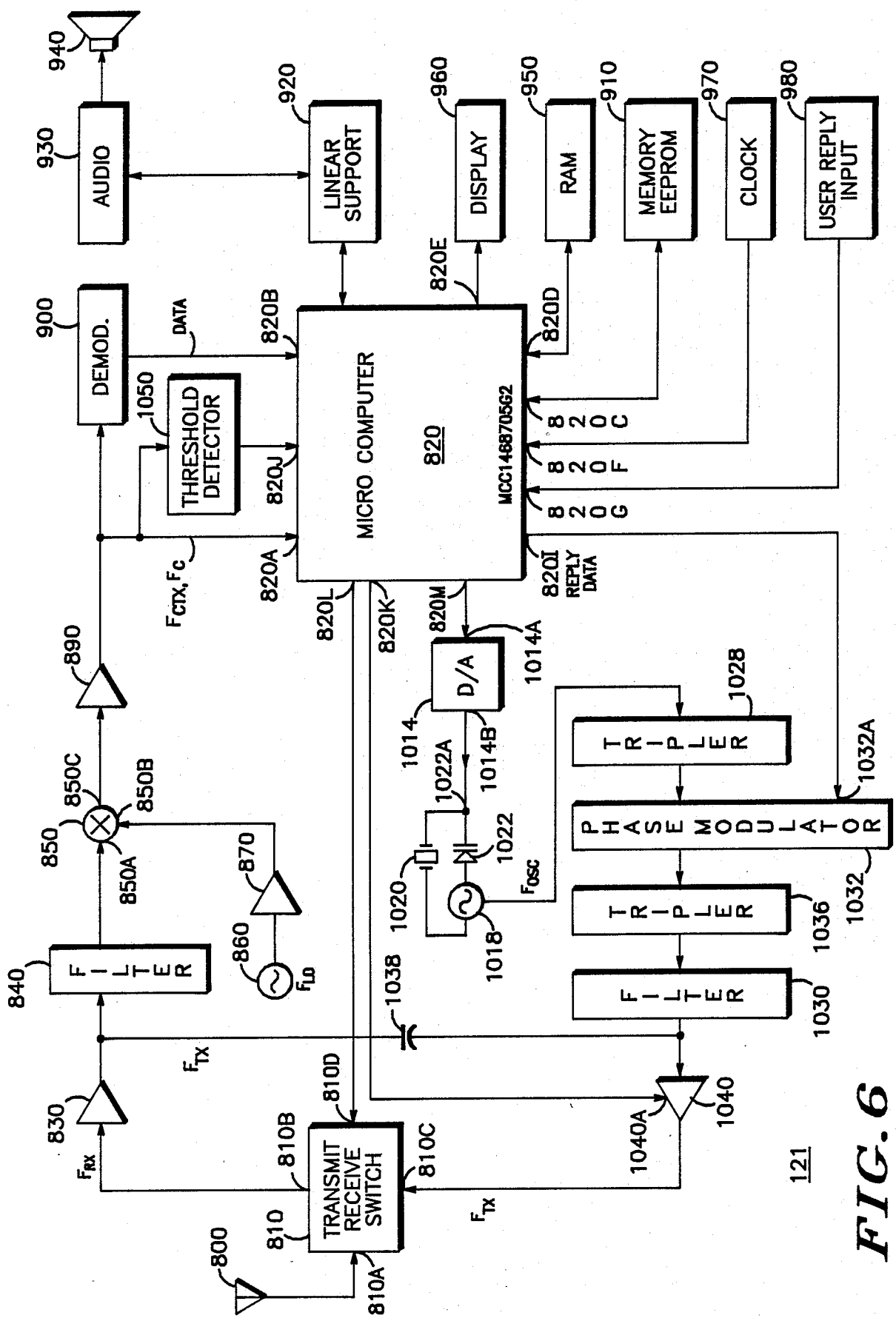
FIG. 6 is a block diagram of one of the ack-back pagers employed in the paging system of the invention.

FIG. 6 is a block diagram of one of ack-back pagers 121, 122 . . . P., namely ack-back pager 121. In one embodiment of the invention, ack-back pagers 121, 122 . . . P transmit acknowledge back signals on the same radio frequency as that on which central station 110 transmits although this is not necessarily a requirement of the system. That is, other embodiments of the invention are contemplated wherein the ack-back pagers transmit ack-back signals at frequencies other than within the spectrum of the paging channel employed by central station 110. However, in the present embodiment, circuitry is included within such ack-back pagers to enable the pagers to accurately tune to and transmit ack-back signals at different sub-bands within the same paging channel spectrum as that employed by central station 110 for transmission of paging signals. More specifically, each of ack-back pagers 121, 122 . . . P is capable of transmitting ack-back signals on a plurality of M different sub-bands within the paging frequency channel on which central station 110 and the ack-back pagers transmit and receive. All of the ack-back pagers within a particular group of M addressed ack-back pagers simultaneously transmit acknowledge back signals back to central station 110 during a time period occurring after such group of M ack-back pagers are addressed and are sent respective messages. To permit such simultaneous transmission of ack-back signals on M different frequency sub-bands via frequency division multiplexing (FDM), it has been found that pagers 121, 122 . . . P must be able to tune to each of the M different sub-bands with extreme accuracy in frequency. The subsequently described frequency control circuitry within ack-back pager 121 permits such accuracy in sub-band frequency tuning. An example of one single conversion receiver which is adaptable to accommodate the aforementioned frequency control circuitry in accordance with the present invention is the Motorola Sensar series display pager as described in the publication "Sensar" Series - Display GSC Radio Pagers, Motorola Publication No. 68P81038C75-A Which is incorporated herein by reference.

Ack-back pager 121 includes a transmit/receive antenna 800 exhibiting an appropriate size and geometry to permit transmission and reception of radio frequency signals on the radio frequency paging channel on which central station 110 transmits and receives. Antenna 800 is coupled to a common port 810A of a transmit receive switch 810. Transmit/receive switch 810 includes a receive port 810B and a transmit port 810C in addition to the above mentioned antenna input port 810A. Switch 810 includes a control input 810D as shown in FIG. 6. When an appropriate control input signal is supplied to control input 810D, transmit/receive switch 810 couples antenna port 810A to receive port 810B to place pager 121 in the receive mode. Alternatively, pager 121 is placed in the transmit mode when an appropriate control signal is supplied to control input 810D such that transmit receive switch 810 couples the antenna input port 810A to transmit port 810C. These control signals are supplied to control input 810D by microcomputer 820. One microprocessor which may be employed as microcomputer 820 is the model MCC1468705G2 manufactured by Motorola, Inc.

Receive port 810B of switch 810 is coupled to the input of a radio frequency amplifier 830. It is noted that the frequency of the radio paging channel on which central station 110 transmits is defined to be $F_{RX}$, for example, 150 MHz. Thus, the radio frequency paging signals which reach ack-back pager 121 and which are provided to amplifier 830 exhibits a frequency of $F_{RX}$ or 150 MHz. Amplifier 830 amplifies the radio paging signals from central paging station 110 and provides such amplified signals to the input of a bandpass filter 840. Filter 840 is typically of the preselector type which filters off any undesired signals adjacent the paging channel frequency.

The output of filter 840 is coupled to an input 850A of a two input mixer 850. Mixer 850 includes inputs 850A and 850B and an output 850C. A local oscillator 860 which oscillates at a frequency of $F_{LO}$ is coupled via an amplifier 870 to mixer input 850B. Mixer 850 down-converts the filtered RF paging signal at frequency $F_{RX}$ thereto by mixing such signal $F_{LO}$ signal. In this manner, the down converted RF signal generated at the output 850C of mixer 850 is at an intermediate frequency of $F_{RX}-F_{LO}$ which is defined to equal $F_C$.

Mixer output 850C is coupled to the input of an intermediate frequency (IF) amplifier 890 which amplifies the down-converted RF paging signals. The output of IF amplifier 890 is coupled to a count input 820A of microcomputer 820 to determine the down-converted reference carrier frequency $F_C$ as later described. The output of IF amplifier 890 is also coupled to the input a demodulator 900 which demodulates the down-converted RF paging signals provided thereto. That is, demodulator 900 separates the preamble, address, and message signals from the carrier wave on which they were transmitted by central station 110. The data signals thus resulting are provided to microcomputer input 820B via a connection to demodulator 900 as shown in FIG. 6. Such data signals include preamble, address, and message signals. Microcomputer 820 of pager 121 decodes the address signals provided at data input 820B and compares the incoming decoded page addresses with the predetermined unique address of such pager 121 which is stored in a code memory 910. Code memory 910 is typically an electronically erasable programmable read only memory (EEPROM) such that unique pager address codes are easily assigned and programmed into each of ack-back pagers 121,122 ... P. As seen in FIG. 6, memory 910 is coupled via a buss to a memory port 820C of microcomputer 820. When microcomputer 820 determines that one of the addresses in a received group of M pager addresses corresponds to the unique address of such pager 121, then microcomputer 820 decodes the following group of M messages. Microcomputer 820 selects which of such messages is intended for pager 121.

In a known fashion, microcomputer 820 generates appropriate output signals which are supplied via linear support module 920 to audio module 930 and speaker 940 to alert the pager user that a message has been received. The selected message is stored in a random access memory (RAM) 950 which is coupled via a bus to microcomputer memory port 820D. A liquid crystal display module 960 is coupled to the display output 820E of microcomputer 820 such that the selected message received by pager 121 can be displayed for viewing by the pager user. Alternatively, the pager user can recall the page message from memory 950 subsequent to the alert signal for viewing later at a more convenient time. A clock circuit 970 is coupled to a clock input 820F of microcomputer 820. Clock 970 provides microcomputer 820 with a reference time base.

A user reply input device 980 is coupled to a data input port 820G of microcomputer 820 as shown in FIG. 6. In one embodiment of the invention, the user reply input device 980 is a four position switch, the positions of which are respectively designated as choices A, B, C, and D. By preagreement between the pager user and the pager caller, each of choices A, B, C, and D is agreed to have a predetermined meaning. For example, choice A when selected by the pager user could be a "Yes" response to the caller's message. Choice B could be "No" response. Choice C is a "Maybe" response and Choice D is a "Cannot Reply Now" response. Those skilled in the art readily appreciate that the output of such a four position switch when used in input device 980 is readily converted to a digital signal which is supplied to data input port 820G for processing by microcomputer 820. Alternatively, a 2 position or YES/NO switch could be employed in user input device 980.

It is noted that user reply input device 980 is not limited to the multi-position switch which was discussed above. Rather, other input devices, for example, a keyboard or other key entry devices may be employed as user input device 980 in other embodiments of the invention to generate reply data.

The reply data is then transmitted back to central station 110 by pager 121 during acknowledge back reply field 390 as shown in the acknowledge back protocol shown in FIG. 4E. The paging channel centered around frequency $F_{RX}$ is divided into M different sub-channels. Each pager of the group of M ack-back pagers which were addressed now respond back simultaneously as a group during the appropriate acknowledge back field. Each of the M pagers of the group responds on a different frequency sub-band within the group of M sub-bands. In one embodiment of the invention wherein M=20, the paging channel is divided into 20 different frequency sub-channels or sub-bands which are centered around a frequency $F_{RX}$ and are separated by sub-channel spacings of approximately 1 kHz. That is, each of the 20 sub-bands, designated sub-bands 1-20, is offset 1 kHz with respect to each other as shown in the table of FIG. 7. The table of FIG. 7 shows each of pagers AB-1, AB-2 . . . AB-20 of a group of M addressed pagers and frequency information with respect to the respective sub-channels or sub-bands on which such pagers acknowledge back or respond. For example, in one embodiment of the invention wherein the center of the paging channel is at a frequency $F_{RX}$ equal to 150 MHz, pager AB-1 of the group of M addressed pagers acknowledges back on a frequency of 149.9905 MHz which corresponds to an offset, $F_D$, of $-.0095$ MHz with respect to the $F_{RX}$ center channel frequency. In a similar fashion, the pager of the group of M addressed pagers which is designated as pager AB-2 acknowledges back on a second sub-band having a frequency of 149.9915 MHz which corresponds to an offset, $F_D$, of $-.0085$ MHz with respect to the $F_{RX}$ center channel frequency. Continuing on with pagers AB-3, AB-4 . . . AB-20, such remaining pagers respond back on the different subchannels specified by the frequencies and offsets shown in the table of FIG. 7.

Each of the group of M pagers designated AB-1, AB-2 . . . AB- 20, and in fact all of the pagers of the population of P acknowledge back pagers are capable of acknowledging back on any one of the M different frequency sub-bands. That is, the control program stored within memory 910 is capable of directing microcomputer 820 and associated frequency synthesis circuitry later described to transmit acknowledge back signals on a selected one of the M or 20 different sub-bands.

In more detail, such frequency synthesis circuitry includes a voltage controlled crystal oscillator 1018 (VCXO) which oscillates at a frequency equal to one ninth of the ack-back signal transmit frequency, $F_{TX}$, under the control of crystal 1020 and varactor 1022. Microcomputer 820 supplies a 12 bit binary number D from output port 820M to input port 1014A of a 12 bit digital to analog (D to A) converter 1014. The computation of D will be described more fully later. An analog DC voltage proportional to D appears at output 1014B and is supplied to input 1022A of varactor 1022 which in turn exhibits a change in capacitance proportional the DC voltage applied thereto. The change in capacitance due to the range of numbers D warps the output frequency of VCXO 1018 over an approximately 2.5 KHz range at the crystal fundamental frequency (150 MHZ/9) in this embodiment. After the VCXO output signal is processed by two triplers 1028 and 1036, the frequency range at the output of tripler 1036 of the $F_{TX}$ signal is 22.5 KHz (or 2.5 KHz$\times$9) centered at 150 MHz. This frequency range is sufficiently wide to include all of the sub-band frequencies in the sub-band frequency look-up table of FIG. 7. which will be discussed later. This frequency range also includes sufficient range to accommodate the tolerances of crystal 1020 as well.

In yet further detail, frequency tripler 1028 triples the frequency of oscillator 1018 to approximately 50 MHz. The output of tripler 1028 is coupled to a phase modulator 1032 which adds either 0 degrees or 60 degrees of phase delay to the 50 MHz signal depending on whether a "0" or "1", respectively, is provided to modulator input 1032A. It is seen that modulator input 1032A is supplied acknowledge back data via a connection to the reply data output port 8201 of microcomputer 820. That is microcomputer 820 supplies acknowledge back data from output port 8201 to phase modulate the acknowledge back transmit signal in modulator 1032. The modulated output signal of modulator 1032 is coupled to frequency tripler 1036 which generates an output signal which is the acknowledge back transmit signal or $F_{TX}$ signal at a frequency ($F_{TX}$) of 150 MHz plus or minus the appropriate offset frequency associated with the sub-band frequency selected for transmission of the ack-back signal. The aforementioned 60 degrees of phase modulation is likewise tripled to 180 degrees. Thus the output of tripler 1036 is a digitally modulated phase shift keyed (PSK) signal at approximately 150 MHz.

The output of tripler is coupled via a filter 1030 to a radio frequency power amplifier 1040 which is described in more detail later. Bandpass filter 1030 filters any undesired signal components from the $F_{TX}$ ack-back signal. Amplifier 1040 amplifies the filtered acknowledge back paging signals provided thereto up to a signal level appropriate for transmission back to central station 110. The output of amplifier 1040 is coupled to the transmit port 810C of transmit/receive switch 810.

A sample of the $F_{TX}$ signal at the output of filter 1030 is provided to the input of filter 840 as shown in FIG. 6. This is accomplished by coupling a small capacitor between the output of filter and the input of filter 840. In this manner the output of filter 1030 is lightly coupled to the input of filter 840 such that a relatively low level version of the ack-back signal at $F_{TX}$ is fed back to filter 840 and the circuitry beyond. As will be shown later, this fed back signal is used by the frequency control algorithm of microprocessor 820 to synthesize the $F_{TX}$ ack-back transmitter signal nearly precisely on the selected sub-band frequency.

It is noted that there is a predetermined relationship between the particular sub-band frequency on which each of ack-back pagers AB-1 - AB-20 responds to either the order of each pager's particular address within the group of M pagers or the order of each pager's particular message within the group of M pagers. From the earlier discussion, it will be recalled that the order of the messages within a group of M messages bears a predetermined relationship to the order in which the addresses for such messages were transmitted in the corresponding address group. The relationship between the selection of frequency sub-bands for ack-back transmission and the order of transmission of the M addresses or M messages is established to enable microcomputer 150 in central station 110 to determine which ack-back signal sub-band transmission corresponds to which acknowledge back pager address of the group of M pagers.

For example, assuming that pager AB-1 in the table of FIG. 7 is the first ack-back pager of the group of M pagers to be addressed or receive a message, then, ack-back pager AB-1 responds back on a sub-channel or sub-band frequency designated sub-band 1 which corresponds to the frequency and offset noted in Table 1. Assuming that pager AB-2 in the table of FIG. 7 is the second pager of the group of M pagers which is addressed or sent a message, then, pager AB-2 acknowledge back on sub-band number 2 which corresponds to a frequency and offset shown in the table of FIG. 7. To continue this example, assuming that pager AB-20 is the twentieth pager of the group of M pagers to be addressed or receive a message, then pager AB-20 acknowledges back on a sub-band frequency 20 which corresponds to the frequency and offset shown in the table of FIG. 7. Although each of pagers AB-1, AB-2 .

. . . AB-20 responds back on the different respective sub-bands 1–20 noted in FIG. 7, all of such pagers respond back simultaneously in a common time slot or field as already described.

It is noted that other predetermined relationships between the ack-back sub-band order and the order in which the addresses or messages were transmitted to the group of M pagers may be employed. That is, although in the example above, the order of the M addresses (or M messages) and the corresponding order of the M sub-bands are both ascending, in another embodiment of the invention in which the order of the addresses of the group of M pagers AB-1 . . . AB-20 is the same as the prior example (ascending), the order of the acknowledge back sub-bands is reversed as compared to the prior example (descending). That is, pager AB-1 responds back on sub-band 20; pager AB-2 responds back on sub-band 19 . . . and pager AB-20 respond back on sub-band 1.

Also, as mentioned briefly earlier in this document, alternatively in another embodiment of the invention, the relationship between the order in which pager addresses or messages were received by the group of M pagers and the order of assignment of sub-bands for ack-back to such M pagers can be arbitrary. What is important is that a predetermined relationship exists between the order of assignment of sub-bands and the order in which the pager addresses or messages arrive at the group of M pagers. Again, this predetermined relationship is programmed into memory 170 of microcomputer 150 in central station 110 such that microcomputer 150 can determine which sub-band is being used by each of the pagers AB-1, AB-2 . . . AB-20 as they acknowledge back.

An example is now presented showing how one of the AB-1, AB-2 . . . AB-20 pagers selects a sub-band frequency on which to respond and generates an acknowledge back signal at that frequency. For purposes of this example, the third pager to be addressed or receive a message in the group of M pagers, that is pager AB-3, will be discussed. In this example, unlike the example of FIG. 4H, pager AB-3 is an acknowledge back pager. After reading the message which is supplied to the display 960 of pager AB-3 (such as pager 121 of FIG. 6), the pager AB-3 user indicates a reply at input device 980 as already discussed. The control program in memory 910 of pager AB-3 causes microcomputer 820 therein to recognize that AB-3 is the third pager of the group M =20 pagers to be addressed. A sub-band look up table is stored in memory 910. The sub-channel look up table includes the appropriate frequency offset, $F_D$, for each of the 20 different frequency sub-channels as shown in FIG. 7. As mentioned, microcomputer 820 of pager AB-3 determines that it has received the third address or third message in the respective address or message group sequences. Using this information, microcomputer 820 fetches from memory the particular frequency offset, FD, from the sub-band look up table in memory 910 which corresponds to the third sub-band or sub-band 3.

In the circuit arrangement of FIG. 6, the ack-back frequency $F_{TX}$ equals the ninth harmonic of the $V_{CXO}$ frequency at 1018. Such $V_{CXO}$ frequency is voltage warped under the control of microcomputer 820. During execution of the microcomputer frequency control algorithm, microcomputer 820 first sets the 12 bit input, D, of the D/A circuit 1014 to a midrange value of 2048 plus the frequency offset $F_D$. In this particular embodiment of the invention, a D/A converter having a range of 4096 is employed as D/A circuit 1014. A value of D=2048 corresponds to the center (150 MHz) of the range of sub-band frequencies set forth in the sub-band look-up table of FIG. 7. There is nearly a linear relationship between 1 step in D and 1 unit change in the ack-back transmit frequency $F_{TX}$. To reiterate, microcomputer 820 initially sets D=2048+$F_D$ to drive the ack-back transmit frequency $F_{TX}$ approximately to the frequency of the selected sub-band.

Oscillator 1018 then exhibits an output frequency whose ninth harmonic (the $F_{TX}$ ack-back transmit signal) is lightly coupled back to the receive portion of ack-back pager 121 through coupling capacitor 1038. The $F_{TX}$ transmit signal is then down-converted to produce the down-converted transmit signal, $F_{CTX}$. Microcomputer 820 then determines the frequency of the down-converted signal, $F_{CTX}$, by counting the frequency of such signal at the microcomputer input 820A. It is noted that previously during the time interval, $T_3$, microcomputer 820 determines the frequency of the down-converted reference carrier signal $F_C$ and stores the result in memory 950. Microcomputer 820 now retrieves the reference carrier frequency count $F_C$ and the current $F_{CTX}$ count from memory 950. Microcomputer 820 also retrieves the $F_D$ frequency offset for the third sub-band from the sub-band look table stored in memory 910 (assuming that the third sub-band is the sub-band which has been selected for transmission of ack-back signals) Microcomputer 820 then computes a new value of D which equals the old D plus $(F_C+F_D)-F_{CTX}$. The new value of D is provided to the D/A circuit 1014 via microcomputer output 820M, thus altering the control voltage applied to varactor 1022. The above expressed algorithm is iterated I times until the difference $((F_C+F_D)-F_{CTX})$ is substantially close to zero. In equation form, $D=D+(F_C+F_D)-F_{CTX}$ or $D_{NEW}=D_{OLD}+(F_C+F_D)-F_{CTX}$. Several iterations I are required because the relationship between frequency and varactor voltage is not precisely linear. In this embodiment of the invention, it has been found that J=4 iterations are sufficient to bring the actual $F_{TX}$ transmit frequency of pager 121 to within approximately 30 Hz of the desired $F_{TX}$ sub-band frequency. Those skilled in the art will appreciate that the invention is not limited to the I=4 iterations presented above by way of example. Clearly, fewer iterations will not bring the actual $F_{TX}$ frequency as close to the desired sub-band frequency and more iterations will bring the actual $F_{TX}$ frequency even closer to the desired sub-band frequency. Thus, both fewer and more iterations of the algorithm than 4 are intended to be within the scope of the invention.

The above described circuit arrangement employs both the receiver section of pager 121 and microcomputer 820 to measure the frequency of the down converted reference carrier at $F_C$ and subsequently the down converted actual transmitter frequency $F_{CTX}$. It accomplishes this task by counting the down converted $F_{RX}$ reference carrier at $F_C$ and by subsequently counting the down-converted actual transmitter frequency at $F_{CTX}$. The frequency control algorithm corrects the actual transmitter frequency $F_{TX}$ by iteratively minimizing the difference between the quantity (reference count $F_C$ plus the offset $F_D$) and the count of the $F_{CTX}$. The algorithm drives this difference substantially to zero in I iterations. Thus, the frequency control algorithm drives the difference $((F_C+F_D)-F_{CTX})$ substantially to zero.

Although, a single conversion embodiment of acknowledge back pager 121 is shown in FIG. 6 and described above, those skilled in the art will appreciate that double and other multiple conversion embodiments of the pager are readily adapted from this invention and are intended to be within its scope.

Each of pagers 121, 122 . . . P includes a threshold detector 1050 coupled between the output of amplifier 890 and input 820J of microcomputer 820. Threshold detector 1050 provides input 820J a logical 0 when the down-converted carrier signal at $F_C$ exhibits a voltage level less than a predetermined threshold level. However, when the signal voltage level of the $F_C$ carrier signal is equal to or greater than such selected predetermined voltage level, then threshold detector 1050 provides a logical 1 to microcomputer input 820J. The threshold is set, for example, so that a signal at the receiver input which is 40 dB above minimum usable receiver sensitivity will trigger threshold detector 1050. Microcomputer 820 includes a power control output 820K which is coupled to a power level control input 1040A of variable output power amplifier 1040. Amplifier 1040 is of the type which can assume different power output levels depending upon the value of the signal provided to 1040A. For example, in this particular embodiment, when a logical 0 is provided to input 1040A, amplifier 1040 operates or transmits at full power, for example at approximately 1.5 watts output. However, when a logical 1 is provided to input 1040A, amplifier 1040 throttles back or reduces power to a second lower power output level which is approximately 40 dB less than the full power output level. In summary, in this embodiment of the invention, when a logical 0 is provided by threshold detector 1050 to microcomputer input 820J indicating that a relatively low level signal is being received, then microcomputer 820 generates a logical 0 at its output 820K. This causes amplifier 1040 to amplify at the first or full output power. However, when threshold detector 1050 provides a logical 1 to microcomputer input 820J, indicating that a relatively high level signal is being received, microcomputer 820 then generates a logical 1 at output 820K. This in turn causes amplifier 1040 to throttle back to the second lower output power level. The above described variable output power level circuit arrangement aids in avoiding the situation when any one of the group of M pagers AB-1 . . . AB-20 generates such a strong ack-back signal at central station 110 that such signal exceeds the dynamic range of the receiver of station 110 and masks the ack-back signals from the other pagers of the group of M.

Although in this particular embodiment of the invention, a two power level amplifier 1040 is employed in conjunction with a single level threshold detector 1050, the invention may also be practiced using threshold detectors with more than one threshold and variable output power amplifiers with more than two selectable output powers. For example, in an alternative embodiment of the invention, threshold detector 1050 is a three range threshold detector which determines if the $F_C$ signal exhibits a low, medium or high signal level. Such a threshold detector conveniently employs first and second thresholds. That is, when threshold detector 1050 determines that the received signal level at the pager is within a first predetermined low signal level range (less than the first threshold), then microcomputer 820 causes a three output power level amplifier, employed as amplifier 1040, to amplify at a high output first power level. When the three range detector 1050 detects that the received signal level is within a medium signal level range (between the first and second thresholds), then microcomputer 820 would causes amplifier 1040 to amplify at a medium output second power level. When detector 1050 determines that the received signal level is within a third high level range (above the second threshold level), then microcomputer 820 causes amplifier 1040 to fully throttle back to a third and lowest power output level. Thus, a power control circuit is provided in which the transmitted output power of the ack-back pager varies inversely with the RF signal level of the paging signals it receives from central station 110.

Microcomputer 820 is programmed to generate a logical 1 at port 820L during the period of time at which pager 121 is to transmit an acknowledge back signal back to central station 110, for example, ack-back time period 390 as shown in FIG. 4E. During all other periods of time for which pager 121 should be in the receive mode, microcomputer 820 is programmed to generate a logical 0 at port 820L. When a logical 1 is generated at output 820L, indicating transmit mode, transmit/receive switch 810 connects antenna port 810A to port 810C thus connecting the transmit amplifier 1040 to antenna 800. However, when a logical 0 is provided to microcomputer port 820L, transmit/receive switch 810 couples antenna port 810A to port 810B and receiver amplifier 830.

Figure 8A:
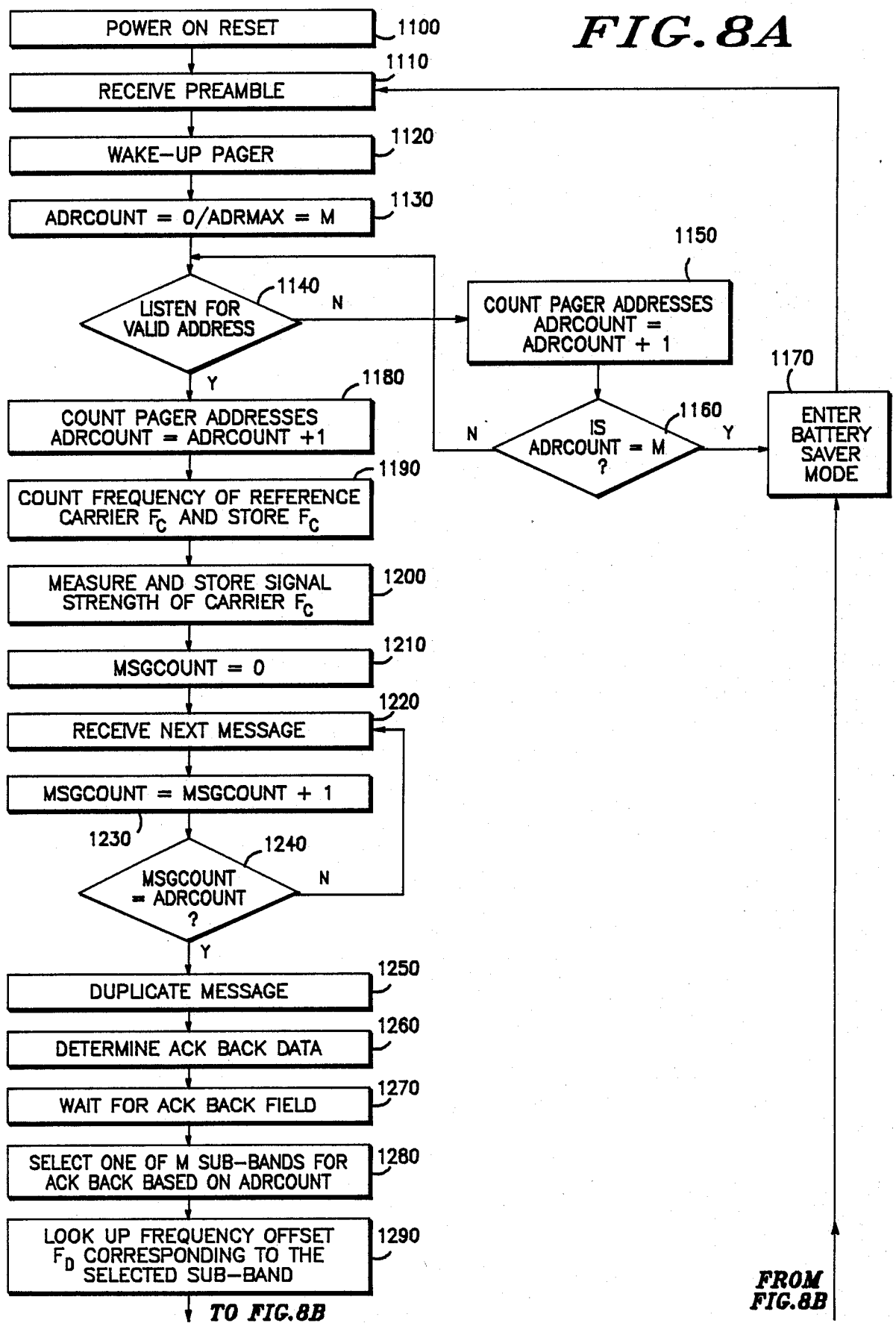
FIGS. 8A and 8B in combination depict a flowchart of the operation of the ack-back pagers of the paging system of the invention.
Figure 8B:
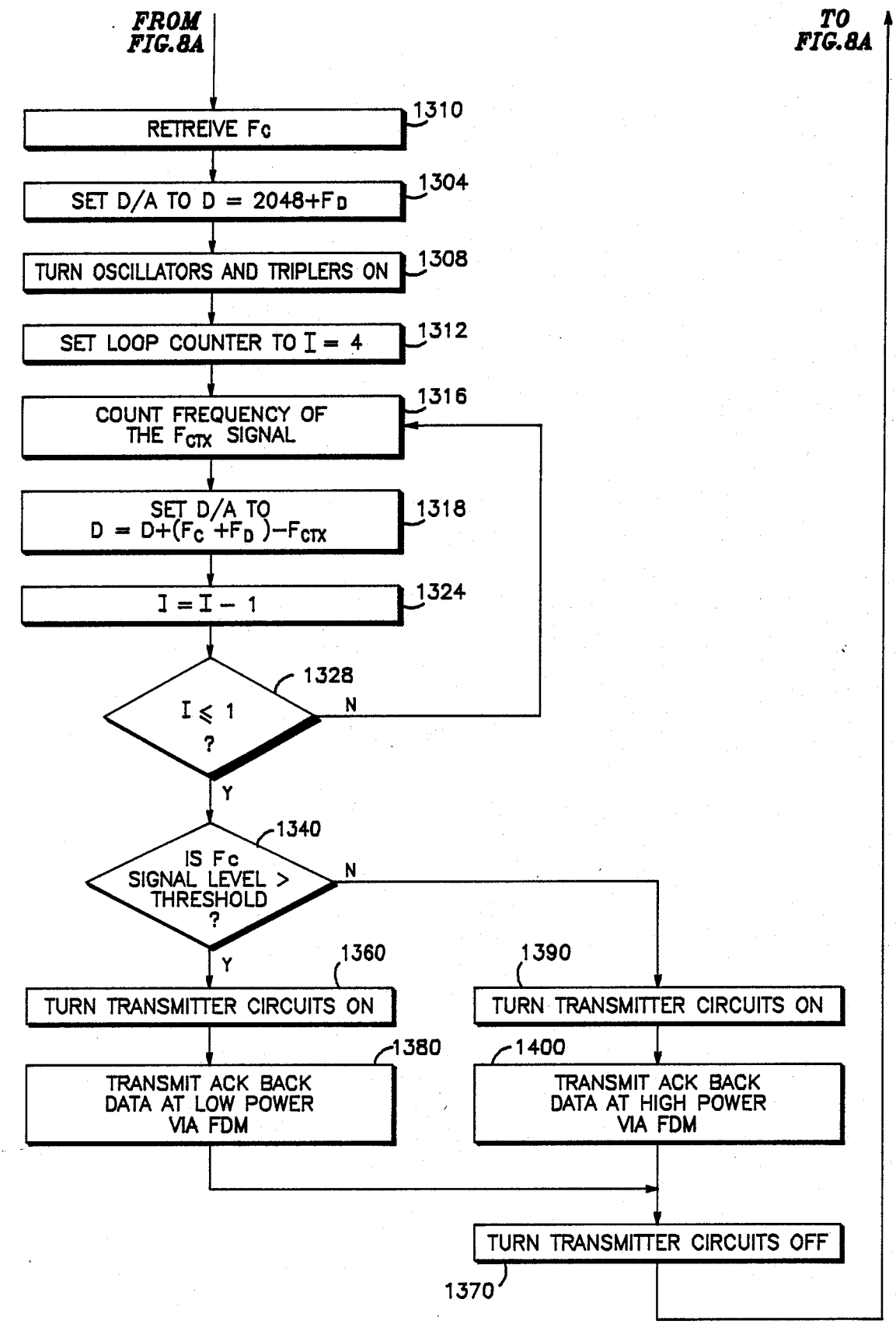

FIG. 8A and 8B in combination depict is a flow chart of the control program stored in memory 910 which controls the operation of microcomputer 820 and pager 121. A power-on-reset step is shown in block 1100. Program variables are initialized at this time. The receiver portion of pager 121 is turned on and becomes synchronized with respect to the paging signals transmitted on the paging channel by central station 110. After becoming initially synchronized, pager 121 goes into a "sleep mode" or battery saving mode as described earlier. When pager 121 receives a preamble signal, as in block 1110, pager 121 wakes up as per block 1120. An address count variable, ADRCOUNT, is then initialized with a value of 0 as per block 1130. A variable ADRMAX which represents the maximum number of ack-back pagers in an ack-back group is set to have a value of M as per block 1130. Pager 121 listens to each of the addresses within a group of M addresses to determine if its particular address is received as per block 1140. For example, at block 1140, the first address of a group of M addresses is checked to determine if it is the valid address for the particular pager 121. If the first address is not the address of pager 121, then the ADR-COUNT variable is incremented by 1 to count the number of pager addresses already received as per block 1150. A determination is then made as to whether all of the addresses of the group of M addresses have been processed, block 1160. If the variable ADRCOUNT is equal to M, then the address of the particular pager 121 has not been received and such pager 121 reenters the battery saver mode as per block 1170 after which pager 121 again powers down and looks to determine if a preamble signal is received. If however in block 1160 ADRCOUNT is not equal to M, that is less than M signifying that all of the M addresses of a group of M addresses have not been received as in the present example with respect to the first address of such group, then flow continues back to block 1140 where pager 121 checks the next address in the group of M addresses for validity. If any address within the group of M addresses is determined to be the address for the particular pager 121, then flow continues from block 1140 to block 1180 at which the variable ADRCOUNT is incremented by 1 such that ADRCOUNT is a number which represents the order of the valid address within the sequencing or group of M addresses.

After the group of M addresses is received by pager 121, pager 121 receives and determines the frequency of the down-converted reference carrier $F_C$ as per block 1190. The signal strength of the carrier $F_C$ is then determined by micro processor 820 as per block 1200.

In the following steps, the particular message within the group of M messages which is intended for a particular pager within the group of M addressed pagers is matched with such pager and displayed thereon. More particularly, prior to commencing to count the number of messages within the group of M messages as such messages are received, a message count variable MSGCOUNT is initialized at a value of 0 as per block 1210. The receiving of the individual messages of the group of M messages commences as per block 1220 at which the next message of such group is received. Initially, the first message of the group of M messages is the "next message" received Upon reception of a message, the MSGCOUNT variable is incremented by 1 to count the number of messages that have been received as per block 1230. A determination is then made as to whether MSGCOUNT equals ADRCOUNT at block 1240. If it is determined that MSGCOUNT does not equal ADRCOUNT, then more messages remain to be received in the group of M messages and flow continues back to block 1220, at which the next message is received. In this example, wherein the first message was received the first time around the loop formed between block 1220 and 1240, the second message is received the second time around such loop and the message counter MSGCOUNT is incremented at 1230 accordingly. When a determination is made that MSGCOUNT equals ADRCOUNT then, the current message is displayed at block 1250. In this manner, the particular message which was intended for a pager within the group of M pagers is displayed by matching the order of the occurrence of such message in the group of M messages with respect to the order of the corresponding address within the group of M addresses.

Ack-back data is supplied to microcomputer 820 by the pager user as per block 1260. The ack-back pager waits as per block 1270 for an ack-back field (time interval) before responding back to the central station 100 with the ack-back data provided by the pager user. It was discussed earlier that M different sub-bands are available in the pager of the invention for transmission of ack-back signals. Each ack-back pager within a group of M addressed pagers responds back to the central station 110 on a different respective sub-band based on the value of the ADRCOUNT variable determined above for such pager as per block 1280. For example, in one embodiment of the invention, if a particular pager within the group of M pagers is the fifth pager of the group to be addressed, then such pager has an ADRCOUNT value of 5. As per the above discussion, the fifth message in the group of M messages corresponds to the fifth pager addressed and is appropriately provided to the display of such fifth pager for viewing by the pager user. In this particular pager wherein ADRCOUNT equals 5, sub-band number 5 is selected from the table of FIG. 7 for use by such pager for transmitting its ack-back signal. That is, the value of ADRCOUNT determines the particular sub-band which is selected for ack-back. Since in this particular example sub-band 5 is selected, microcomputer 820 accesses the sub-band chart of the table of FIG. 7 and looks up the frequency offset $F_D$ corresponding to sub-band number 5 as per block 1290. The value of $F_C$, the down-converted carrier frequency, is then retrieved from memory or is otherwise acquired as per block 1310.

Microcomputer 820 initially sets the input signal D to D/A converter 1014 to a value of $2048+F_D$ in block 1304. Oscillator 1018 along with triplers 1028 and 1036 are turned on in block 1308. A loop counter I is set to a value of 4 in block 1312. I represents the number of iterations made by the frequency control algorithm and in actual practice may be greater or lesser than 4 as previously explained. As mentioned earlier the $F_{TX}$ transmit signal is fed back to the receiver portion of pager 121 and is down-converted to produce the down converted $F_{CTX}$ signal. The frequency of the down converted $F_{CTX}$ signal is counted at block 1316 and is stored in memory 910. Microcomputer 820 recalculates the value the of D according to the relationship $D=D+(F_C+F_D)-F_{CTX}$ and provides the new value of D to D/A converter 1014. The loop counter I is decremented by 1 at block 1324. The loop counter I is tested at block 1328. If I has not yet been decremented down to a value of less than or equal to 1 then flow continues back to block 1316 where the frequency $F_{CTX}$ is again determined. Otherwise, flow continues to block 1340 as discussed subsequently.

A determination is then made by microcomputer 820 as to whether the signal level of the $F_C$ reference carrier is greater than the aforementioned predetermined threshold level. If the $F_C$ signal level is greater than a predetermined threshold level as determined at block 1340, then the transmitter circuits of pager 121 are turned on, as at block 1350. The ack-back data is then transmitted back to central station 110 at a low power level on the already selected frequency sub-band via frequency division multiplexing as per block 1360. After transmission of the ack-back data, the transmitter circuits are turned off at block 1370 and the battery saver mode is reentered as at block 1170. If, however, it is determined at block 1340 that the $F_C$ carrier reference signal does not exhibit a signal level greater than the predetermined threshold, then the transmitter circuits of pager 121 are turned on at block 1390 and the ack-back data is transmitted back to central station 110 at a high power level on the selected frequency sub-band via frequency division multiplexing as per block 1400. After such transmission of the ack-back data, the transmitter circuits are turned off at block 1370 and the battery saver mode is reentered at block 1170.

From the above description, it is clear that the invention involves a method of radio paging for employment in a radio paging system including a central paging station for transmitting paging signals on a paging channel frequency $F_{RX}$ to a plurality of remotely located acknowledge back radio pagers. The central station transmits a reference carrier signal, that is an $F_{RX}$ signal, at frequency FRX at selected times. The method of the invention is a method of controlling the frequency FTX on which the acknowledge back pager transmits an acknowledge back signal. The method includes the step of receiving and down-converting the $F_{RX}$ signal thus producing a down-converted $F_C$ signal. The method includes measuring the frequency of the down-converted $F_C$ signal. The method further includes selecting a sub-band from a plurality of frequency sub-bands within a predetermined range of frequencies for transmission of an ack-back signal thus determining a selected sub-band The method includes the step of determining a frequency offset $F_D$ with respect to a predetermined frequency within the range of frequencies. The method includes the step generating a radio frequency signal substantially at a frequency $(F_C+F_D)-F$ and up-converting the radio frequency signal to a transmit frequency $F_{TX}$ corresponding to the selected sub-band.

In summary, the foregoing describes an apparatus and method for controlling the transmit frequency of an acknowledge back radio pager which permits the pager to transmit on a selected one of a plurality of frequency sub-bands with high accuracy.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. In a radio paging system including a central paging station for transmitting paging signals including a group of pager addresses on a paging channel frequency $F_{RX}$ to a group of corresponding remotely located acknowledge back radio pagers, said central station transmitting said pager addresses in a predetermined order over a first time interval, each acknowledge back pager capable of controlling a sub channel frequency $F_{TX}$ on which it transmits acknowledge back signals, an acknowledge back pager of said system comprising:

receiving means for receiving said paging signal on the channel frequency $F_{RX}$;

measuring means, coupled to said receiving means, for measuring the channel frequency of the received paging signal;

selecting means for selecting a sub-band frequency from a plurality of frequency sub-bands within a predetermined range of frequencies in accordance with a predetermined relationship based on the predetermined order in which said pager's address is being transmitted in said group, said selected frequency sub-band being the sub-channel frequency for transmission on an acknowledge back signal by said pager;

determining means for determining a frequency offset $F_D$ of the measured channel frequency corresponding to said selected sub-band frequency;

transmitter means, coupled to said determining means, for generating an acknowledge back signal at said selected sub-band frequency including both the measured channel frequency and the determined offset frequency.

2. In a radio paging system including a central paging station for transmitting paging signals on a paging channel frequency $F_{RX}$ to a plurality of remotely located acknowledge back radio pagers, a method of controlling a sub-channel frequency $F_{TX}$ on which an acknowledge back pager of said system transmits an acknowledge back signal, said method comprising the steps of;

receiving the paging signal and down-converting the channel frequency $F_{RX}$ thereof to produce a signal at a down-converted frequency $F_C$;

measuring the frequency $F_c$ of said down-converted signal;

selecting a sub-band frequency unique to said acknowledge back pager from a plurality of frequency sub-bands within a predetermined range of frequencies as the sub-channel frequency for transmission of an acknowledge back signal from said pager;

determining a frequency offset $F_D$ corresponding to the selected sub-band frequency;

generating a modulated signal at an initial frequency based on a desired frequency setting $(F_C+F_D)$ and up-converting the initial frequency of the modulated signal to a transmit sub-channel frequency $F_{TX}$ corresponding substantially to said selected sub-band frequency;

down-converting the frequency $F_{TX}$ of said generated up-converted signal and measuring the down-converted frequency $F_{CTX}$ thereof; and adjusting said initial frequency of said modulated signal in a direction to converge the measured frequency $F_{CTX}$ to the desired frequency setting $F_C+F_D$, whereby the transmit sub-channel frequency $F_{TX}$ of the pager's acknowledge back signal is caused to be set precisely at the selected sub-band frequency, 3. In a radio paging system including a central paging station for transmitting paging signals on a paging channel frequency $F_{RX}$ to a plurality of remotely located acknowledge back radio pagers, a method of controlling a sub-channel frequency $F_{TX}$ on which an acknowledge back pager of said system transmits an acknowledge back signal, said method comprising the steps of;

A. receiving the paging signal and down-converting the channel frequency $F_{RX}$ thereof to produce a signal at a down-converted frequency $F_C$;

B. measuring the frequency $F_C$ of said down-converted signal;

C. selecting a sub-band frequency unique to said acknowledge back pager from a plurality of frequency sub-bands within a predetermined range of frequencies at the sub-channel frequency for transmission of an acknowledge back signal from said pager, said sub-channel frequency being unique to said pager;

D. determining a frequency offset $F_D$ corresponding to the selected sub-band frequency;

E. generating a modulated signal at an initial frequency based on a desired frequency setting $(F_C+F_D)$ and up-converting said initial frequency of the modulated signal to an initial transmit sub-channel frequency $F_{TX}$ approximately corresponding in frequency to said selected sub-band;

F. down-converting said frequency $F_{TX}$ of the generated signal to generate a signal with a down converted frequency $F_{CTX}$;

G. generating the modulated signal at an adjusted frequency in a direction to converge the measured frequency $F_{CTX}$ to the desired frequency setting $(F_C+F_D)$ and up-converting said adjusted signal to a transmit sub-channel frequency $F_{TX}$ corresponding more closely in frequency to said selected sub-band; and H. repeating steps F and G until the frequency of the transmit signal $F_{TX}$ is substantially equal to the frequency of the selected sub-band.

4. In a radio paging system including a central paging station for transmitting paging signals on a paging channel frequency $F_{RX}$ to a plurality of remotely located acknowledge back pagers, an acknowledge back pager capable of controlling a sub-channel frequency $F_{TX}$ on which it transmits acknowledge back signals, said pager comprising:

means for receiving the paging signal on the channel frequency $F_{RX}$;

means for measuring the channel frequency of the received paging signal;

controller means for determining a desired sub-channel frequency setting based on the measured channel frequency and a selected frequency offset frequency unique to said acknowledge back pager and for generating a control signal with an initial value substantially representative thereof;

frequency synthesizer governed by said control signal to generate a signal at a frequency which is used by said pager for transmitting the acknowledge back signal thereof; and means for measuring the frequency of said signal generated by said frequency synthesizer, said controller means further operative to adjust the initial value of said control signal in a direction to converge the measured frequency of said signal to the desired sub-channel frequency.

5. The acknowledge back pager in accordance with claim 4 including:

means for amplifying the acknowledge back signal of said paper prior to transmission thereof in accordance with a controlled amplification setting;

means for measuring the magnitude of the amplified acknowledge back signal; and means governed by said magnitude measurement of the measuring means to control the amplification setting of said amplifying means.

6. The acknowledge back pager in accordance with claim 4 wherein the controller means comprises a programmed digital controller which generates a digital control signal, the digital code of which represents a value of the frequency setting; and wherein the frequency synthesizer comprises a voltage controlled oscillator which is digitally controlled by said digital control signal to generate the sub-channel frequency signal.

7. The acknowledge back pager in accordance with claim 4 including a modulating means for modulating the sub-channel frequency signal, said controller means being further operative to govern the modulating means to modulate the sub-channel frequency signal with the acknowledge back signal of said pager.

* * * * *